US011630996B1

(12) United States Patent
O'Shea et al.

(10) Patent No.: US 11,630,996 B1
(45) Date of Patent: Apr. 18, 2023

(54) SPECTRAL DETECTION AND LOCALIZATION OF RADIO EVENTS WITH LEARNED CONVOLUTIONAL NEURAL FEATURES

(71) Applicant: Virginia Tech Intellectual Properties, Inc., Blacksburg, VA (US)

(72) Inventors: Timothy James O'Shea, Arlington, VA (US); Tamoghna Roy, Arlington, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 1302 days.

(21) Appl. No.: 16/017,396

(22) Filed: Jun. 25, 2018

Related U.S. Application Data

(60) Provisional application No. 62/534,810, filed on Jul. 20, 2017, provisional application No. 62/523,871, (Continued)

(51) Int. Cl.
*G06N 3/08* (2006.01)
*H04B 1/16* (2006.01)

(52) U.S. Cl.
CPC .............. *G06N 3/08* (2013.01); *H04B 1/16* (2013.01)

(58) Field of Classification Search
CPC ........ G06N 3/08; G06N 3/0454; G06N 20/00; G06N 5/046; H04B 1/16; H04B 17/373;
(Continued)

(56) References Cited

U.S. PATENT DOCUMENTS 8,494,464 B1* 7/2013 Kadambe ................ H04K 3/45
455/67.11
8,515,473 B2* 8/2013 Mody ...................... H04K 3/45
455/450
(Continued)

OTHER PUBLICATIONS

Asoke K. Nandi and E. E. Azzouz, "Algorithms for Automatic Modulation Recognition of Communication Signals", IEEE transactions on communications, vol. 46, No. 4, pp. 431-436, Apr. 1998 (Year: 1998).*
(Continued)

*Primary Examiner* — Alfonso Castro
(74) *Attorney, Agent, or Firm* — Fish & Richardson P.C.

(57) ABSTRACT

Methods, systems, and apparatus, including computer programs encoded on computer storage media, for training and deploying machine-learned classification of radio frequency (RF) signals. One of the methods includes obtaining input data corresponding to the RF spectrum; segmenting the input data into one or more samples; and for each sample of the one or more samples: obtaining information included in the sample, comparing the information to one or more labeled signal classes that are known to the machine-learning network, using results of the comparison, determining whether the information corresponds to the one or more labeled signal classes, and in response, matching, using an identification policy of a plurality of policies available to the machine-learning network, the information to a class of the one or more labeled signal classes, and providing an output that identifies an information signal corresponding to the class matching the information obtained from the sample.

45 Claims, 12 Drawing Sheets

Related U.S. Application Data filed on Jun. 23, 2017, provisional application No. 62/523,888, filed on Jun. 23, 2017.

(58) Field of Classification Search
CPC .............. H04B 17/101; H04B 17/3912; H04B 17/3913; H04B 17/24; H04N 21/442; H04N 21/4383; H04N 21/44016; H04N 21/4402; H04N 21/812; H04L 25/0254; H04L 25/03165; H04L 2025/03464; H04L 25/0252
USPC ............................................... 706/21; 725/14
See application file for complete search history.

(56) References Cited

U.S. PATENT DOCUMENTS

| | | | |
|---|---|---|---|
| 2009/0254499 A1* | 10/2009 | Deyo | G06Q 10/10 706/12 |
| 2018/0211179 A1* | 7/2018 | Dzierwa | H04B 17/391 |

OTHER PUBLICATIONS

O'Shea et al., "Recurrent Neural Radio Anomaly Detection," arXiv preprint arXiv: 1611.00301, Nov. 1, 2016 (Year: 2016).*
Eric Blossom, "GNU Radio: Tools for Exploring the Radio Frequency Spectrum", Linux Journal, No. 122, 2004.
Olivier Chapelle, Alexander Zien, "Semi-Supervised Classification by Low Density Separation", in AISTATS, pp. 57-64, 2005.
O. Chapelle, B. Schölkopf, and A. Zien, "Semi-Supervised Learning (Chapelle, et al, eds; 2006) [book reviews]," IEEE Transactions On Neural Networks, vol. 20, No. 3, Mar. 2009.
Tianqi Chen and Carlos Guestrin, "XGBoost: A Scalable Tree Boosting System", proceedings of the $22^{nd}$ acm sigkdd international conference on knowledge discovery and data mining, ACM, pp. 785-794, 2016.
F. Chollet, Keras: The Python Deep Learning Library, 2015.
Stefano Cioni, Giulio Colavolpe, Vittoria Mignone, Andrea Modenini Alberto Morello, Michelangelo Ricciulli, Alessandro Ugolini, and Yuri Zanettini, "Transmission parameters optimization and receiver architectures for DVB-S2X systems" International Journal of Satellite Communications and Networking, vol. 34, No. 3 pp. 337-350, 2016.
Jia Deng, Wei Dong, Richard Socher, Li-Jia Li, Kai Li and Li Fei-Fei, "ImageNet: A Large-Scale Hierarchical Image Database", in CVPR09, 2009.
Martin Ester, Hans-Peter Kriegel, Jiirg Sander, and Xiaowei Xu, "A Density-Based Algorithm for Discovering Clusters in Large Spatial Databases with Noise", in Kdd, vol. 96, pp. 226-231, 1996.
Matt Ettus and Martin Braun, "The Universal Software Radio Peripheral (USRP) Family Of Low-Cost SDRs", Opportunistic Spectrum Sharing and White Space Access: The Practical Reality, pp. 3-23, 2015.
Matt Ettus, Universal Software Radio Peripheral The Foundation for Complete Software Radio Systems, 2009.
Jerome H. Friedman, "Greedy Function Approximation: A Gradient Boosting Machine", Annals of Statistics, vol. 29, No. 5, 1189-1232, 2001.
W. A. Gardner and C. M. Spooner, "Signal Interception: Performance Advantages of Cyclic-Feature Detectors", IEEE Transactions on Communications, vol. 40, No. 1, pp. 149-159, Jan. 1992.
W. A. Gardner and C. M. Spooner, "Cyclic spectral analysis for signal detection and modulation recogni-tion," in Military Communications Conference, 1988. MILCOM 88, Conference record. 21st Century Military Communications—What's Possible? 1988 IEEE, IEEE, pp. 419-424, 1988.
I. Goodfellow, Y. Bengio, and A. Courville, Deep learn-ing. MIT press, 2016.

Anthony Goldbloom, "Data prediction competitions, Far more than just a bit of fun", in Data Mining Workshops (ICDMW), 2010 IEEE International Conference, pp. 1385-1386; 2010.
Kaiming He, Xiangyu Zhang, Shaoqing Ren, and Jian Sun, "Delving Deep into Rectifiers: Surpassing Human-Level Performance on ImageNet Classification" in proceedings of the 2015 IEEE International Conference on Computer Vision, pp. 1026-1034, 2015.
Kaiming He, Xiangyu Zhang, Shaoqing Ren, Jian Sun, "Deep Residual Learning for Image Recognition", proceedings of the IEEE Conference on Computer Vision and Pattern Recognition, pp. 770-778, 2016.
Shue-Zen Hsue, and Samir S. Soliman, "Automatic Modulation Rego Gnition of Digitally Modulated Signals", in Mili-tary Communications Conference, 1989. MILCOM'89. Conference Record. Bridging the Gap. Interoperabil-ity, Survivability, Security, pp. 645-649, IEEE, 1989.
Diederik P. Kingma and Jimmy Lei Ba, "Adam: A method for stochastic optimization," arXiv preprint arXiv:1412.6980, 2014.
Günter Klambauer, Thomas Unterthiner and Andreas Mayr, "Self-Normalizing Neural Networks", arXiv prepring arXiv: 1706.02515, 2017.
Alex Krizhevsky, Ilya Sutskever, and Geoffrey E. Hinton, "ImageNet Classification with Deep Convolutional Neural Networks", in Advances in neural information processing systems, pp. 1097-1105, 2012.
Yann LeCun, Leon Bottou, Yoshua Bengio, and Patrick Haffner, "Gradient-Based Learning Applied to Document Recognition", proceedings of the IEEE, vol. 86, No. 11, pp. 2278-2324, Nov. 1998.
Yann LeCun and Yoshua Bengio, "Convolutional Networks for Images, Speech, and Time Series", The Handbook of Brain Theory and Neural Networks, vol. 3361, No. 10, 1995.
Min Lin, Qiang Chen, and Shuicheng Yan, "Network In Network", CoRR, vol. abs/1312.440, [online] available: http://arxiv.org/abs/1312.4400, 2013.
Laurens van der Maaten and Geoffrey Hinton, "Visualizing Data using t-SNE", Journal of Machine Learning Research, vol. 9, pp. 2579-2605, 2008.
Jonathan Masci, Ueli Meier, Dan Cire, san, and Jurgen Schmidhuber, "Stacked Convolutional Auto-Encoders for Hierarchical Feature Extraction", in Artificial Neural Networks and Machine Learning-ICANN, pp. 52-59, Springer, 2011.
Vinod Nair and Geoffrey E. Hinton, "Rectified Linear Units Improve Restricted Boltzmann Machines", in Proceedings of the $27^{th}$ International Conference on machine Learning (ICML-10), pp. 807-814, 2010.
Asoke K. Nandi and E. E. Azzouz, "Algorithms for Automatic Modulation Recognition of Communication Signals", IEEE transactions on communications, vol. 46, No. 4, pp. 431-436, Apr. 1998.
Tim O'Shea and Nathan West, "Radio Machine Learning Dataset Generation with GNU Radio", proceedings of the GNU Radio conference, vol. 1, 2016.
Timothy J. O'Shea, Johnathan Corgan, and T. Charles Clancy, "Convolutional Radio Modulation Recognition Networks", in international conference on Engineering Applications of Neural Networks, Springer, pp. 213-226, 2016.
Tim O'Shea, and Jakob Hoydis, "An Introduction to Deep Learning for the Physical Layer", arXiv preprint arXiv: 1702,00832, 2017.
Aaron van den Oord, Sander Dieleman, Heiga Zeny, Karen Simonyan, Oriol Vinyals, Alex Graves, Nal Kalchbrenner, Andrew Senior, and Koray Kavukcuoglu, "Wavenet: A Generative Model For Raw Audio" ArXiv prepring arXiv: 1609.03499, 2016.
J. R. Quinlan, "Bagging, Boosting, and C4.5", Proceedings of the Thirteenth National Conference on Artificial Intelligence and the Eighth Innovative Applications of Artificial Intelligence, Conference, vol. 1, pp. 725-730, 1994.
Shaoqing Ren, Kaiming He, Ross Girshick, and Jian Sun, "Faster R-CNN: Towards Real-Time Object Detectionwith Region Proposal Networks" in advances in neural information processing systems, pp. 91-99, 2015.
Ramprasaath R. Selvaraju, Abhishek Das, Ramakrishna Vedantam Michael Cogswell, Devi Parikh, and Dhruv Batra, "Grad-CAM: Why did you say that?", ArXiv prepring arXiv: 1611.07450, 2016.

(56) References Cited

OTHER PUBLICATIONS

Karen Simonyan and Andrew Zisserman, "Very Deep Convolutional Networks For Large-Scale Image Recognition"arXiv preprint arXiv, 1409, 1556, 2014.

Karen Simonyan, Andrea Vedaldi, and Andrew Zisserman, "Deep Inside Convolutional Networks: Visualising Image Classification Models and Saliency Maps", arXiv prepring arXiv; 2013.

Srivastava, N., Hinton, G., Krizhevsky, A., Sutskever, I. & Salakhutdinov, R., "Dropout: A simple way to prevent neural networks from overfitting", The Journal of Machine Learning Research, vol. 15, No. 1, 1929-1958 (2014).

Chad M. Spooner, Apurva N. Mody, Jack Chuang, and Josh Petersen, "Modulation Recognition Using Second- and Higher-Order Cyclostationarity", in Dynamic Spectrum Access Networks (DySPAN), 2017 IEEE International Symposium, pp. 1-3, 2017.

C.M. Spooner and W.A. Gardner, "Robust Feature Detection for Signal Interception" IEEE transactions on communications, vol. 42, No. 5, pp. 2165-2173, May 1994.

Christian Szegedy, Wei Liu, Yangqing Jia, Pierre Sermanet, Scott Reed,Dragomir Anguelov, Dumitru Erhan, Vincent Vanhoucke, Andrew Rabinovich, "Going Deeper with Convolutions", proceedings of the IEEE International Conference on Computer Vision and pattern recognition, pp. 1-9, 2015.

Christian Szegedy, Alexander Toshev, and Dumitru Erhan, "Deep Neural Networks for Object Detection" in advances in Neural Information Processing Systems, pp. 2553-2561, 2013.

Michel Vidal-Naquet and Shimon Ullman "Object recognition with Informative features and Linear Classification", in ICCV, vol. 3, p. 281, 2003.

Pascal Vincent, Hugo Larochelle, Yoshua Bengio and Pierre-Antoine Manzagol, "Extracting and Composing Robust Features with Denoising Autoencoders" In proceedings of the $25^{th}$ international conference on machine learning, ACM, pp. 1096-1103, 2008.

N.E. West and Timothy J. O'Shea, "Deep Architectures for Modulation Recognition" 2017 IEEE International Symposium on Dynamic Spectrum Access Networks (DySPAN).

Jason Yosinski, Jeff Clune, Yoshua Bengio, and Hod Lipson, "How transferable are features in deep neural networks?", CoRR, vol. abs/1411.1792, [online] available:http://arxiv.org/abs/1411.1792, 2014.

Tevfik Yucek and H"useyin Arslan, "A Survey of Spectrum Sensing Algorithms for Cognitive Radio Applications", IEEE Communications Surveys & Tutorials, vol. 11, No. 1, pp. 116-130, 2009.

Xingyu Zeng, Wanli Ouyang, Junjie Yan, Hongsheng, Li,Tong, Xiao, Kun Wang, Yu Liu, Yucong Zhou, Bin Yang, Zhe Wang, Hui Zhou, and Xiaogang Wang, "Crafting GBD—Net for Object Detection", arXiv preprint arXiv; 2016.

Matthew D. Zeiler and Rob Fergus, "Visualizing and Understanding Convolutional Networks", in European conference on computer vision, Springer, pp. 818-833, 2014.

Xiaojin Zhu and Andrew B. Goldberg, Introduction to Semi-Supervised Learning, Synthesis Lectures on Artificial Intelligence and Machine Learning, vol. 3, No. 1 pp. 1-130, 2009.

\* cited by examiner

820

DETERMINE, USING THE INFORMATION OBTAINED FROM THE SAMPLE, AT LEAST ONE OF A TEMPORAL LOCALIZATION OR A SPECTRAL LOCALIZATION OF THE INFORMATION OBTAINED FROM THE SAMPLE
822

↓

PROVIDE AN OUTPUT INCLUDING AT LEAST ONE OF THE TEMPORAL LOCALIZATION OR THE SPECTRAL LOCALIZATION OF THE INFORMATION OBTAINED FROM THE SAMPLE
824

FIG. 8B

SPECTRAL DETECTION AND LOCALIZATION OF RADIO EVENTS WITH LEARNED CONVOLUTIONAL NEURAL FEATURES

CROSS-REFERENCE TO RELATED APPLICATION

This application claims priority to U.S. Provisional Application No. 62/523,871, filed on Jun. 23, 2017, U.S. Provisional Application No. U.S. 62/523,888, filed on Jun. 23, 2017, and U.S. Provisional Application No. U.S. 62/534,810, filed on Jul. 20, 2017. The disclosures of these prior applications are considered part of, and are incorporated by reference in, the disclosure of this application.

TECHNICAL FIELD

The present disclosure relates to spectral detection, identification, and localization of radio events using machine-learning networks with learned convolutional neural features.

BACKGROUND

Radio frequency (RF) waveforms are prevalent in many systems for communication, storage, sensing, measurements, and monitoring. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other modes of communication, such as through an internal system bus in a computer or through local or wide-area networks.

SUMMARY

In general, the subject matter described in this disclosure can be embodied in methods, apparatuses, and systems for training and deploying machine-learning networks to communicate over RF channels, and specifically to encode and decode information for communication over RF channels.

According to one aspect of the subject matter described in this application, a method, performed by one or more processors to detect one or more information signals in a radio frequency (RF) spectrum using a machine-learning network, includes obtaining input data corresponding to the RF spectrum; segmenting the input data into one or more samples; and for each sample of the one or more samples: obtaining information included in the sample, comparing the information obtained from the sample to one or more labeled signal classes that are known to the machine-learning network, using results of the comparison, determining whether the information obtained from the sample corresponds to the one or more labeled signal classes that are known to the machine-learning network, and in response to a determination that the information obtained from the sample corresponds to the one or more labeled signal classes that are known to the machine-learning network: matching, using an identification policy of a plurality of policies available to the machine-learning network, the information obtained from the sample to a class of the one or more labeled signal classes, and providing an output that identifies an information signal corresponding to the class matching the information obtained from the sample.

Implementations according to this aspect may include one or more of the following features. For example, the method further includes determining, using the information obtained from the sample, at least one of a temporal localization or a spectral localization of the information obtained from the sample, where providing the output includes providing at least one of the temporal localization or the spectral localization of the information obtained from the sample. In some examples, providing the output for each sample includes providing at least one of a range of time or a range of frequency that bounds the respective sample in the input data.

In some implementations, the method further includes identifying one or more existing clusters that group the one or more samples or information included in the one or more samples into the one or more labeled signal classes, and in response to a determination that the information obtained from the sample does not correspond to the one or more labeled signal classes that are known to the machine-learning network, determining a new cluster that is different from the one or more existing clusters. In some examples, determining whether the information obtained from the sample corresponds to the one or more labeled signal classes that are known to the machine-learning network includes: determining a distance metric that represents at least one of a difference between the sample and a cluster of the one or more existing clusters or a distance between the sample and one or more prior samples that were processed through the machine-learning network; conditioned on the distance metric being less than or equal to a threshold value, determining that the information obtained from the sample corresponds to the one or more labeled signal classes; and conditioned on the distance metric being greater than the threshold value, determining that the information obtained from the sample does not correspond to the one or more labeled signal classes.

In some implementations, the method further includes updating at least one of the machine-learning network or the identification policy to associate the information obtained from the sample to a new label.

In some implementations, the method further includes, in response to a determination that the information obtained from the sample does not correspond to the one or more labeled signal classes that are known to the machine-learning network: processing the sample through one or more layers of a second machine-learning network; upon processing the sample through the one or more layers of the second machine-learning network, obtaining a compressed representation of the sample from a layer of the one or more layers of the second machine-learning network, wherein the compressed representation of the sample has a dimension that is a reduction of a dimension of the sample; and determining, using the compressed representation of the sample, a distance metric that represents a difference between the sample and a second sample of the one or more samples. In some examples, the second machine-learning network is different from the machine-learning network. In other examples, the machine-learning network includes the second machine-learning network.

In some implementations, obtaining the compressed representation of the sample includes obtaining the compressed representation of the sample from a dimension reduction operation independent of the second machine-learning network.

In some implementations, processing the sample through the one or more layers of the second machine-learning network includes: determining one or more parameters of the second machine-learning network to generate a reconstructed signal corresponding to the sample; and adjusting the one or more parameters of the second machine-learning network to minimize a reconstruction error that represents a difference between the sample and the reconstructed signal.

In some implementations, the method further includes grouping, based on the distance metric, compressed representations of the one or more samples into one or more clusters. In some implementations, the method further includes based on a deviation of the distance metric from a reference, determining that the sample includes a feature that does not match a feature of the second sample of the one or more samples.

In some implementations, the method further includes: determining learned feature maps corresponding to one or more labeled signal classes that are known to the machine-learning network; and in response to a determination that the information obtained from the sample does not correspond to the one or more labeled signal classes that are known to the machine-learning network, determining, using the learned feature maps, one or more clusters corresponding to the sample. In some examples, determining the one or more clusters further includes determining the one or more clusters in response to a determination that the information obtained from the sample does not match expected information corresponding to the RF spectrum.

In some implementations, the method further includes: modifying the sample to include at least one of a noise signal, a frequency offset, a time delay, a fading effect, a distortion effect, or a change in a signal to noise ratio; processing the sample through one or more layers of the machine-learning network; obtaining information included in the modified sample; determining, corresponding to the information obtained from the modified sample, a predicted class among one or more labeled signal classes that are known to the machine-learning network; comparing the predicted class with a known class corresponding to the sample; and based on results of the comparison, adjusting at least one of the noise signal, the frequency offset, the time delay, the fading effect, the distortion effect, or the change in the signal to noise ratio. A level of the adjustment may correspond to an increase in a probability that the predicted class matches the known class corresponding to the sample.

In some implementations, the method further includes determining a number corresponding to the one or more samples and a time length of each sample that increase the probability that the predicted class matches the known class corresponding to the sample. In some examples, the level of the adjustment further corresponds to a decrease in a complexity of determining that the predicted class matches the known class corresponding to the sample.

In some implementations, the machine-learning network includes a recurrent neural network that includes one or more recurrent layers or quasi-recurrent layers configured to store data for a known period of time, where the method further includes processing the one or more samples through the recurrent neural network to generate an expected error distribution; obtaining a second input data corresponding to the RF spectrum, the second input data comprising one or more observation regions; processing the second input data through the recurrent neural network to generate a predictor error corresponding to each observation region; and determining whether the predictor error corresponding to each observation region deviates from the expected error distribution using a threshold value generated based on a plurality of data streams corresponding to the RF spectrum.

In some implementations, wherein the machine-learning network includes at least one of a deep dense neural network (DNN), a recurrent or quasi-recurrent neural network (RNN) such as one or more long short term memory (LSTM) layers configured to store data for a certain period of time, a convolutional neural network (CNN) that includes a series of parametric multiplications, additions, and non-linearities, or a residual neural network (ResNet) that employs connections parallel to layers of the machine-learning network or bypasses one or more of the layers of the machine-learning network.

In some implementations, wherein obtaining the information included in the sample includes obtaining at least one of a modulation of a signal portion in the sample, a signal type of a signal portion in the sample, a power range of a signal portion in the sample in a time domain, spectral information of a signal portion in the sample in a frequency domain, spatial information about transmitters and receivers of the input data, or a channel response of the transmitters and receivers. In some implementations, the method further includes: determining whether the class matching the information obtained from the sample corresponds to a correct class of the sample; and determining a probability that represents a likelihood for a next sample to be classified to the correct class among the one or more labeled signal classes that are known to the machine-learning network, where providing the output further includes providing an accuracy value for each of the one or more labeled signal classes that are known to the machine-learning network.

In some implementations, segmenting the input data into the one or more samples includes defining one or more regions or points corresponding to at least one of temporal or spectral information included in the input data, where providing the output includes providing a predicted class to each of the one or more regions or points.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects,

BRIEF DESCRIPTION OF THE DRAWINGS

FIGS. 8A and 8B are flowcharts illustrating example methods of detecting, classifying, and outputting features of input data.

Like reference numbers and designations in the various drawings indicate like elements.

DETAILED DESCRIPTION

Figure 1:
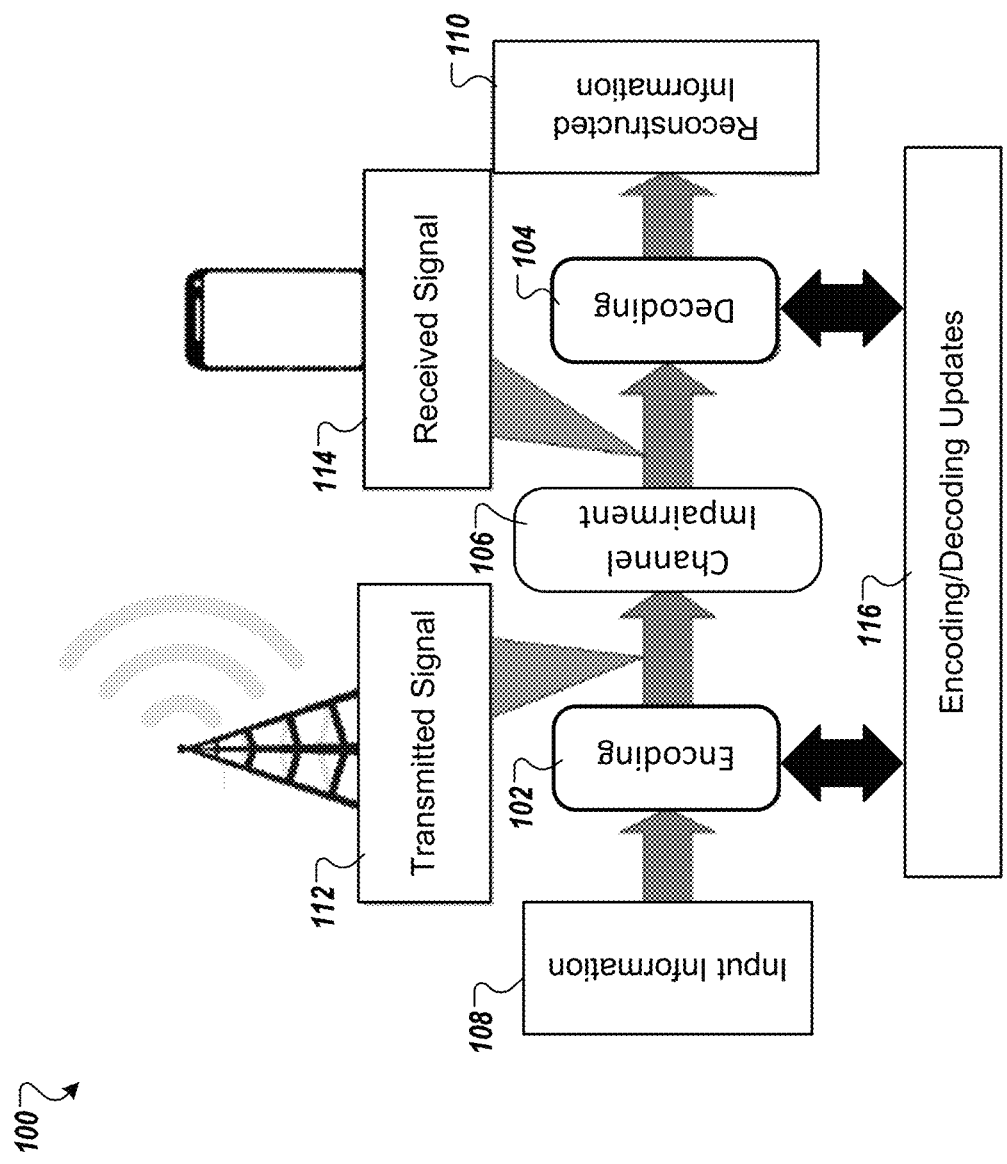
FIG. 1 illustrates an example of a radio frequency (RF) system that implements a machine-learning encoder and a machine-learning decoder to perform learned communication over one or more RF channels.

Systems and techniques are disclosed herein that enable machine learning and deployment of communication over an impaired RF channel. In some implementations, at least one machine-learning network is trained to encode information as a signal that is transmitted over a radio transmission channel, and to decode a received signal to recover the original information. The training may be designed to achieve various criteria, such a low bit error rate, low power, low bandwidth, or low complexity, performing well in particular regimes such as at a low signal to noise (SNR) ratio or under specific types of fading or interference, and/or other criteria. The results of training such machine-learning networks may then be utilized to deploy real-world encoders and decoders in communication scenarios to encode and decode information over various types of RF communication media. In some implementations, further learning and adaptation of the encoder and decoder are implemented during deployment, based on feedback information. These encoders and decoders may replace or augment one or more signal processing functions such as modulation, demodulation, mapping, error correction, or other components which exist in those systems today.

The disclosed implementations present a novel approach to how digital radio systems are designed and deployed for radio communications applications. For example, the disclosed implementations may help improve a typically slow and incremental process of radio signal processing engineering, and instead enable a new way of designing, constructing, and realizing radio communications systems. By implementing machine-learning networks that may be trained to learn suitable encoding and decoding techniques for different types of communication media, techniques disclosed herein offer various advantages, such as improved power, resiliency, and complexity advantages over presently available systems. This can be especially important for communications channels which have very complex sets of effects which are hard to model, or hard to optimize for using other approaches.

Implementations disclosed herein may be applied to a wide range of radio communication systems, such as cellular, satellite, optical, acoustic, physical, emergency handheld, broadcast, point-to-point, Wi-Fi, Bluetooth, and other forms of radio that undergo transmission channel impairments. Channel impairments may include, for example, thermal noise, such as Gaussian-like noise, to more complex impairments such as multi-path fading, impulse noise, spurious or continuous jamming, interference, distortion, hardware effects, and other impairments.

The encoder and decoder may implement encoding and decoding technique that are learned from one or more machine-learning networks that have been trained to learn suitable input-output encoding and decoding mappings based on one or more objective criteria. For example, the machine-learning networks may be artificial neural networks. During training, the machine-learning networks may be adapted through selection of model architecture, weights, and parameters in the encoder and/or the decoder to learn encoding and decoding mappings. The encoding and decoding machine-learning networks may be trained jointly or may be trained iteratively.

In some implementations, an encoder machine-learning network and decoder machine-learning network are implemented as an autoencoder, in which the encoder network and decoder network are jointly optimized. In such scenarios, the autoencoder may be trained by modeling the effects of an impaired channel as one or more regularization layers (e.g., regularization layers, transforming layers, variational layers/samplers, noise layers, mixing layers, etc.) in the autoencoder network or as another set of differentiable functions representing the behavior of a wireless channel. The layers used in the channel may form a regularization function across random behavior of a channel.

During training, an encoder machine-learning network and decoder machine-learning network may be trained to perform unsupervised, or partially supervised, machine learning to determine techniques for transmitting and receiving information over an impaired channel. Therefore, in some scenarios, rather than being reliant upon pre-designed systems for error correction, modulation, pre-coding, and shaping, the disclosed implementations herein may adaptively learn techniques for encoding information into waveforms that are transmitted over a channel, as well as techniques for decoding received waveforms into reconstructed information. The encoder machine-learning network and/or decoder machine-learning network may be trained on real or simulated channel conditions. Encoders and/or decoders that utilize results of training such machine-learning networks may further be updated during deployment, thus providing advantages in adapting to different types of wireless system requirements, in some cases improving the throughput, error rate, complexity, and power consumption performance of such systems.

In some implementations, the machine-learning network included in the encoder or decoder are trained with one or more training datasets of RF waveforms that have been labeled with corresponding types RF waveforms. In some cases, the training datasets include a portion that has been labeled with corresponding types) of RF waveform and another portion that has not been labeled with specific types of RF waveforms. In some scenarios, the training datasets may not include samples that have been labeled with specific types of RF waveforms. In any of the example cases, the machine-learning network may be trained to receive input RF waveforms, identify a type of RF waveforms among the types seen during training or determine one or more new types for the input RF waveforms.

In some implementations, the machine-learning network included in the encoder or decoder provides an output that represents one or more temporal characteristics of the input RF waveforms. For instance, the output may include time-domain information regarding a span of time of each RF waveform in the input RF waveforms. The output may include frequency-domain information regarding a range of frequency of each RF waveform in the input RF waveforms. In some cases, the output includes both of the time-domain information and the frequency-domain information, which may represent a bound of each RF waveform in the input RF waveforms. In some examples, the bound of each RF waveform is visualized as a bounding box in a visualization of the input RF waveforms. The output may include various other information regarding, for example, a phase, a modulation, or a power range of each RF waveform. The output may further include spatial information about transmitters and receivers of the input RF waveforms, or a channel response of the transmitters and receivers.

As such, regardless of the type of RF channel or RF channel impairment, implementations disclosed herein can provide broadly applicable techniques for learning representations of information that enable reliable communication over impaired RF channels. Depending on the configuration of the training system and data sets and channel models used, such machine-learning communication techniques can specialize in performance for a narrow class of conditions, signal or channel types, or may generalize and optimize performance for a wide range of signal or channel types or mixtures of one or more signals or channels.

FIG. 1 illustrates an example of a radio frequency (RF) system that implements a machine-learning encoder and a machine-learning decoder to perform learned communication over one or more RF channels. As shown, the system 100 includes an encoder 102 and a decoder 104, which respectively implement encoding and decoding techniques that are learned by machine learning networks to communicate over an impaired RF channel 106.

In scenarios of training, the encoder 102 include a machine-learning network that learns how to represent the input information 108 as a transmitted signal 112 for transmission over the channel 106. Analogously, during training, the decoder 104 includes a machine-learning network that learns how to decode a received signal 114 into reconstructed information 110 that approximates the original input information 108. During training, the encoder 102 and/or decoder 104 may be trained by a network update process 116. The encoder 102 and decoder 104 may be trained to achieve various types of objective functions, such as a measure of reconstruction error, a measure of computational complexity, bandwidth, latency, power, or various combinations therefor and other objectives.

In scenarios of deployment, the encoder 102 and decoder 104 may implement encoding and decoding techniques that were previously learned from training, or may be (further) trained during deployment. The encoder 102 and decoder 104 may be deployed in various application scenarios to perform communication, using the encoding and decoding representations that were learned during training. In some implementations, the encoder 102 and/or decoder 104 are further updated during deployment based on real-time performance results such as reconstruction error, power consumption, delay, etc. In some cases, error feedback of loss functions occurs in some instances via a communications bus, or a protocol message within the wireless system which can be used to update the encoder and/or decoder, along with information to help characterize the response of the channel.

The input information 108 and reconstructed information 110 may be any suitable form of information that is to be communicated over a channel, such as a stream of bits, packets, discrete-time signals, or continuous-time waveforms. Implementations disclosed herein are not limited to any particular type of input information 108 and reconstructed information 110, and are generally applicable to learn encoding and decoding techniques for communicating a wide variety of types of information over the RF channel 106.

In some implementations, the encoder 102 and decoder 104 employ one or more signal processing operations, which are suited to the type of RF communication domain. As examples, the encoder 102 and/or decoder may implement filtering, modulation, analog-to-digital (A/D) or digital-to-analog (D/A) conversion, equalization, or other signal processing methods that may be suitable for a particular types of RF signals or communication domains. In some implementations, the encoder 102 and/or decoder 104 implement one or more transmit and receive antennas, and other hardware or software suitable for transmitting signals 112 and receiving signals 114 over the RF channel 106.

Therefore, in such implementations, as shown in the example of FIG. 1, the transmitted signal 112 and received signal 114 represent actual RF waveforms that are transmitted and received over the RF channel 106 through one or more antennas. Thus, the encoder 102 and decoder 104 represent generalized mappings between information 108/110 and RF waveforms 112/114.

By contrast, in other implementations, the system 100 implements signal processing and RF transmission/reception processes separately from the encoder 102 and decoder 104. In such implementations, one or more signal transmission and/or signal reception components, such as filtering, modulation, A/D or D/A conversion, single or multiple antennas, etc., are represented as part of the channel 106. In such cases, the impairments in the channel 106 include transmitter/receiver effects, such as filtering impairments, additive noise, or other impairments in the transmitter and/or receiver components. Accordingly, in such scenarios, the transmitted signal 112 and received signal 114 represent intermediate representations of information 108 and information 110, respectively, and the channel 106 represents a general transformation of those intermediate representations of information to and from actual RF waveforms that are transmitted and received over an RF medium. For example, the transmitted signal 112 and received signal 114 may represent basis coefficients for RF waveforms, time-domain samples of RF waveforms, distributions over RF waveform values, or other intermediate representations that may be transformed to and from RF waveforms.

In scenarios of training, the reconstructed information 110 may be compared with the original information 108, and the encoder 102 and/or the decoder 104 may be trained (updated) based on results of the reconstruction. In some implementations, updating the encoder 102 and/or decoder 104 is also based on other factors, such as computational complexity of the machine-learning networks (which can be measured, for example, by the number of parameters, number of multiplies/adds, execution time, Kolmogorov complexity, or otherwise), transmission bandwidth or power used to communicate over the channel 106, or various combinations thereof and other metrics.

In some implementations, the encoder 102 and the decoder 104 include artificial neural networks that consist of one or more connected layers of parametric multiplications, additions, and non-linearities. In such scenarios, updating the encoder 102 and/or decoder 104 may include updating weights of the neural network layers, or updating connectivity in the neural network layers, or other modifications of the neural network architecture, so as to modify a mapping of inputs to outputs.

The encoder 102 and the decoder 104 may be configured to encode and decode using any suitable machine-learning technique. In general, the encoder 102 may be configured to learn a mapping from input information 108 into a lower-dimensional or higher-dimensional representation as the transmitted signal 112. Analogously, the decoder 104 may be configured to learn a reverse mapping from a lower-dimensional or higher-dimensional received signal 114 into the reconstructed information 110.

As an example, the mappings that are implemented in the encoder 102 and decoder 104 may involve learning a set of basis functions for RF signals. In such scenarios, for a particular set of basis functions, the encoder 102 may transform the input information 108 into a set of basis coefficients corresponding to those basis functions, and the basis coefficients may then be used to generate a transmitted RF waveform (for example, by taking a weighted combination of the basis functions weighted by the basis coefficients) . Analogously, the decoder 104 may generate the reconstructed information 110 by generating a set of basis coefficients from a received RF waveform (for example by taking projections of the received RF waveform onto the set of basis functions). The basis functions themselves may be any suitable orthogonal or non-orthogonal set of basis functions, subject to appropriate constraints on energy, amplitude, bandwidth, or other conditions.

During deployment, in some implementations, the encoder 102 and/or decoder 104 utilize simplified encoding and decoding techniques based on results of training machine-learning networks. For example, the encoder 102 and/or decoder 104 may utilize approximations or compact look up tables based on the learned encoding/decoding mappings. In such deployment scenarios, the encoder 102 and/or decoder 104 may implement more simplified structures, rather than a full machine-learning network. Techniques such as distillation may be used to train smaller networks which perform the same signal processing function.

In some implementations, the encoder 102 and/or decoder 104 include one or more fixed components or algorithms that are designed to facilitate communication over RF channels, such as expert synchronizers, equalizers, etc. As such, during training, the encoder 102 and/or decoder 104 may be trained to learn encoding/decoding techniques that are suitable for such fixed components or algorithms.

RF signals that are transmitted and received by system 100 may include any suitable radio-frequency signal, such as acoustic signals, optical signals, or other analog waveforms. The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

Figure 2:
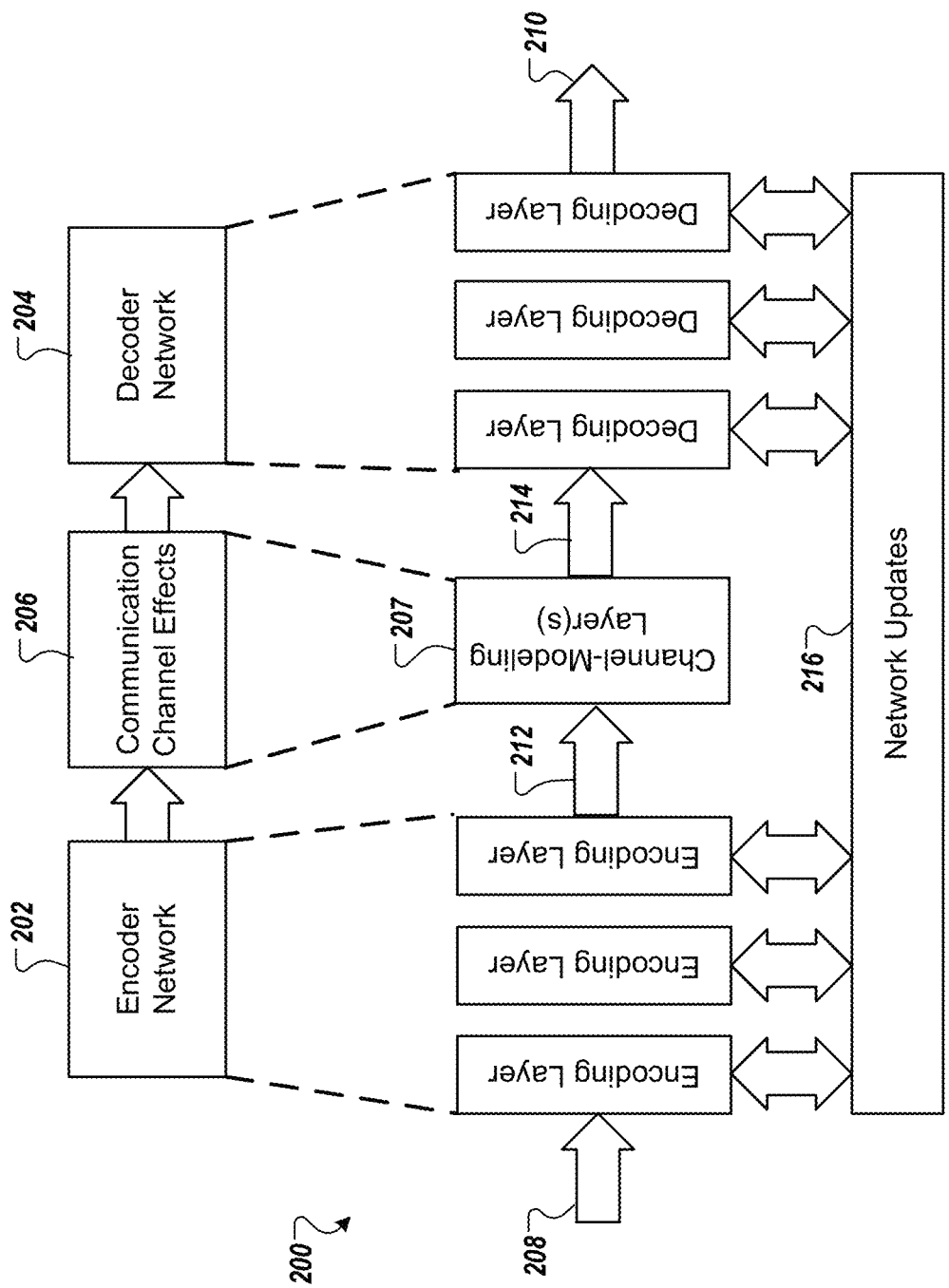
FIG. 2 illustrates an example of a network structure of machine-learning encoder and decoder networks that may be implemented in an RF system to perform learned communication over RF channels.

FIG. 2 illustrates an example of a network structure of machine-learning encoder network and decoder networks that may be implemented in an RF system to perform learned communication over RF channels.

The network structure 200 uses one or more layers that form an encoder network 202 and a decoder network 204. The output of each layer is used as input to the next layer in the network. Each layer of the network generates an output from a received input in accordance with current values of a respective set of parameters. For example, in some implementations, the encoder network 202 and/or decoder network 204 include a plurality of networks that may be collectively or iteratively trained. As such, the network input 208 in FIG. 2 may be the original information (e.g., input information 108 in FIG. 1, above), or may be an output of previous one or more layers in the encoder network 204. Analogously, the network output 210 may represent the reconstructed information (e.g., reconstructed information 110 in FIG. 1, above), or may be an input into subsequent one or more layers in the decoder network 204. In some instances, networks may not be sequential in nature, leveraging connections between various layers or neurons which bypass or route through a plurality of possible architectures.

During training, the encoder network 202 and/or decoder network 204 may be trained to learn encoding and/or decoding techniques for communicating over various types of RF channels. During deployment, the encoder network 202 and/or decoder network 204 (having been trained) may be implemented in an encoder and/or decoder. Alternatively, in some scenarios of deployment, a deployed encoder and decoder may utilize simplified encoding and decoding mapping based on results of training the encoder network 202 and/or decoder network 204. In the latter scenario, the encoder network 202 and/or decoder network 204 is only utilized during training, and provide learned encoding and/or decoding techniques that may be utilized in more simplified encoders and decoders that are deployed in real-world systems. Further discussion of such simplified deployment scenarios is provided in regards to FIG. 7, below.

In the example of FIG. 2, the encoder network 202 and decoder network 204 are implemented using a neural network structure 200 that is configured as an autoencoder. In the scenario of an autoencoder structure, the encoder and decoder are jointly trained to learn best representations of information for communication over the channel 206. In general, however, the network structure 200 may be configured as separate networks in the encoder network 202 and decoder network 204, which may be jointly or iteratively trained. During training, the encoder network 202 and/or decoder network 204 may be updated by a network update process 216.

In general, the encoder network 202 and/or decoder network 204 may include one or more collections of multiplications, divisions, and summations or other operations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent network, where sequences of training information may be used in some instances). Parameters and weight values in the network may be used for a single multiplication, as in a fully connected neural network (DNN), or they may be "tied" or replicated across multiple locations within the network to form one or more receptive fields, such as in a convolutional neural network, a dilated convolutional neural network, a residual network unit, or similar. A collection of one or more of these layers may constitute both the encoder 202 and the decoder 204, as shown in the example of FIG. 2. The specific structure for the networks may be explicitly specified at design time, or may be selected from a plurality of possible architecture candidates to ascertain the best performing candidate.

In some implementations, the encoder network 202 includes an output layer that includes a linear regression layer. The decoder network 204 may include at least one of (i) an output layer that includes a linear layer for regression of reconstructed information 210 in decoding the received RF signal 214, or (ii) a sigmoid or hard-sigmoid activation layer for probability regression or slicing of the received RF signal 214, or (iii) an activation of a combination of sigmoid expressions such as a SoftMax or hierarchical SoftMax which can compute a probabilistic expression such as a pseudo-likelihood of a discrete message or set of bits.

In some implementations, the encoder network 202 and/or decoder network 204 include one or more layers that implement fixed communications algorithms, such as synchronization, equalization, etc. As such, in some scenarios, the encoder network 202 and/or decoder network 204 may be trained and deployed to learn suitable encoding and/or decoding techniques based on such fixed layers in the networks. Therefore, in general, the network structure 200 disclosed herein enables flexible design and training of the encoder network 202 and decoder network 204, for example by incorporating one or more existing communication algorithms that may be deployed in real-world systems in conjunction with machine-learning techniques to optimize around those fixed algorithms.

The example of FIG. 2 shows only one possible implementation of a network structure that may be implemented. In general, implementations are not limited to these specific types of layers, and other configurations of layers and non-linearities may be used, such as dense, fully connected, and/or DNN layers, including rectified linear-unit (ReLU), sigmoid, tanh, and others. The network structure 200 uses these layers to predict an output 210 for a received input 208. In some implementations, a linear regression layer is implemented on the output of the encoder 202 and a linear layer on the output of the decoder 204 (for soft decoding), or a hard-sigmoid activation on the output of the decoder 204 (for hard decoding).

A transmitted signal 212, created by the encoder 202, may be the actual RF waveform in analog form, or may be a series of radio samples in time, frequency, or any other signal representation basis, or may be an intermediate representation (e.g., RF samples, basis coefficients, distributions over RF waveform values, etc.), for mapping the input information 208 into an RF waveform for transmission over the channel 206. Analogously, the received signal 214 may be the actual received RF waveform in analog form, or may be an intermediate representation (e.g., RF samples, basis coefficients, distributions over RF waveform values, etc.), for mapping a received RF waveform into the reconstructed information 210. For example, in the scenario where the encoder 202 and decoder 204 are implemented as a variational auto-encoder, the transmitted RF signal 212 and received RF signal 214 may represent distributions over RF waveform values.

The network structure 200 may also include one or more regularization layers 207. In some instances, the regularization layers may have at least one of weight regularization on convolutional network layer weights, activity regularization on dense network layer activations, or other stochastic impairments on activations or weights, such as dropout. In some instances, or in addition to these, the layers may perform additional approximation of non-linearities present in a channel system (such as amplifier or RF component behaviors), or they may leverage variational layers such as sampling from a random distribution specified by or parameterized by weights or activations.

In some implementations, the regularization layer(s) models impairment effects in the channel 206, which may be include various types of impairments in an RF medium and/or transmission and reception components. Such regularization layers 207 may be implemented during training of the network structure 200, in which case the regularization layer(s) 207 may be implemented as one or more layers in an overall auto-encoder structure to represent impairment effects of the channel 206. During evaluation or deployment over a real RF channels, the channel 206 would be a real-world communication channel (including possible transmitter and/or receiver effects), and the corresponding regularization layers 207 would be removed from deployment, with only the network layers of the encoder 202 and the decoder 204 being deployed on the real channel 206.

In general, however, regularization layers may be implemented for various in different parts of the network structure 200 for various reasons, such as to prevent over-fitting, or to implement dropout, such as a penalty on the convolutional layer weights, to encourage minimum energy bases, or to implement a penalty on dense layer activations to encourage sparsity of solutions, or to improve generalization of the system to unseen conditions or channel states or behaviors.

In scenarios of using regularization layer(s) 207 to model the channel 206 during training, the network structure 200 may implement domain-specific regularization to model RF channel impairment effects. For example, the regulation layer(s) may model different types of impairments that occur during over-the-air transmission in a wireless RF system, such as additive Gaussian thermal noise, unknown time and rate of arrival, carrier frequency and phase offset, fading, hardware distortions, interference, and/or delay spread in the received signal.

Such channel-modeling regularizers 207, such as Gaussian noise and dropout, may be used during training and removed during evaluation or deployment over real channels. In radio communications, additive noise, such as Additive White Gaussian Noise (AWGN) may be modeled by adding a real-valued Gaussian random variable to different signal components, which may be signal basis functions (e.g., in-phase (I) and quadrature (Q) components), that are passed through the channel. In some implementations, a normalization layer is implemented before the AWGN effects, which normalizes the average power incoming activations, for example to a normalized value equal to one. This form of constraint can be applied to the encoder to enforce a wide range of possible waveform design criteria, such as a maximum power, minimum power, mean power, mean amplitude, peak to average power ratio, or a wide range of potential properties of the transmit waveform which may be desired as a hard constraint. Alternative, similar such waveform design objectives can be included as soft constraints which are combined into the network's loss function during training.

Channel-modeling regularization layers 207 may also be implemented to model unknown time and rate of arrival, for example by applying a random or a priori unknown shift and scaling in the time domain, which may model scenarios in which radio propagation times vary and clocks on distributed radio systems are not synchronized. These effects may be modeled, for example, by a random time shift and a random time-dilation rate that have Gaussian distributions.

As other examples of channel-modeling regularization layers 207, carrier frequency and phase offset may be modeled as rotations in signal components, which may be signal basis functions. In some implementations, sampling is performed using complex baseband representations, in which case unknown offsets in center frequency and absolute phase of arrival due to unsynchronized oscillators on transmitter and receiver, as well as Doppler shift, may result in static or linear polar mixing of the different signal components. To simulate a real system and to improve generalization, such regularization layers may randomly select a phase and a frequency offset, or a linear phase ramp based on an expected center frequency offset error due to independent drifting oscillators.

As yet another example of channel-modeling regularization layers 207, delay spread in the received signal may be modeled to simulate the arrival of numerous delayed and phase shifted copies of a signal arriving at the receiver. Since this is simulated as a linear system and we assume stability over a single sample time window, we can choose a random non-impulsive channel delay spread filter and convolve it with the input signal to obtain an output which has been spread in time linearly according to a random channel response. This assumption is generally safe as long as the window is smaller than the channel coherence time. In the case where we seek to optimize a signal larger than one coherence time, we may treat the channel progression as a sequence with some degree of correlation, where we may learn a method for correcting the sequence of delay spread modes.

Such delay spread and coherence time may vary in different types of communication systems, including wireline and space-based wireless systems which can sometimes have very short impulsive channel responses, or high frequency and dense multi-path wireless systems which can have long delay spreads. In some implementations, the delay spread is modeled as a regularization layer that implements one or more convolutions or filtering operations on the transmitted RF signal.

In some implementations, the network structure 200 is utilized with one or more fixed transmission and/or receiving techniques and may adapt the layers of the encoding network 202 and/or the decoding network 204 to learn encoding and decoding operations that are suitable for those fixed transmission/reception components. For example, in some scenarios the network structure 200 may employ fixed filtering, sampling, modulation, equalization, subcarrier assignment, reference signal insertion, encoding, or other transmission/reception techniques, and may learn suitable network layer parameters or network structures that adapt the overall communication system to best utilize those fixed components.

A general design objective for the network structure 200 may be to obtain a desired reconstruction performance for the reconstructed information 210, subject to other objectives or constraints. For example, certain realizations of the system may favor reduced power and/or bandwidth, other improved properties of the RF signals transmitted over the channel, or improved computational complexity. As such, the system may evaluate a trade-off between these objectives, which may be used in order to help determine the specific architecture used for encoding, decoding, or other signal inference tasks.

Figure 3:
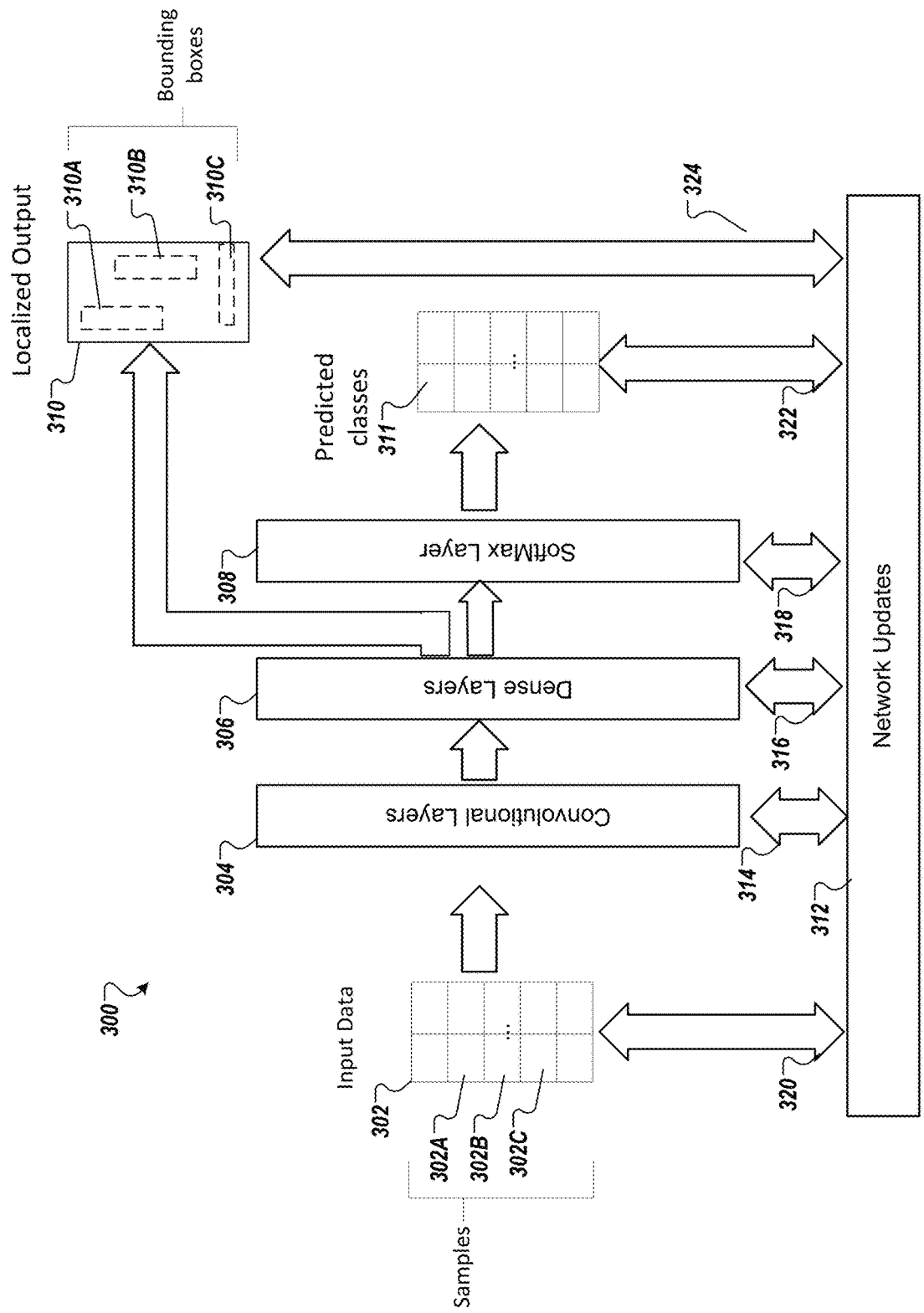
FIG. 3 illustrates an example of a machine-learning network system that performs classification of input data and provides a predicted class of the input data.

FIG. 3 illustrates an example of a machine-learning network system that performs classification/regression of input data (e.g., RF signals) to provide an output corresponding to the input data. The machine-learning network system 300 provides the output 310, the output 311, or both. In some examples, the machine-learning network system 300 is implemented at the encoder network 202 or the decoder network 204 in FIG. 2. In some examples, the machine-learning network system 300 is implemented at an independent receiver station or at an electronic device configured to detect or process the input data 302. The machine-learning network system 300 may include various layers such as one or more convolutional layers 304 and one or more dense layers 306. In some example, one or more SoftMax layers 308 may follow the one or more dense layers 306. Each layer may perform its designated function based on activation of the corresponding layer. The machine-learning network system 300 may be updated by the update by a network update operation 312.

The input data 302 may include various types of RF signals, raw time series, learned filter banks of the time series, wavelet transforms, or the canonical spectrogram form. The input data 302 may include temporal information and spectral information such as frequency and phase. In some examples, the input data 302 include a gain level, an antenna configuration, propagation angle, and special location of the transmitter, etc. In some examples, the input data 302 and output 310 are visualized based on, for example, temporal and spectral information, which will be further explained with regard to FIGS. 5A and 5B.

During training, the input data 302 may include a wide range of signals such as the very-high frequency (VHF), ultra-high frequency (UHF), and super-high frequency (SHF) signals. The input data 302 may also include a noise signal, an interference with another signal, a time delay, a frequency shift, or a distortion effect, or a fading effect. Some of the effects may be intentionally added to mimic their propagation environments or hardware (e.g., transmitters, receivers) influences. In some examples, the effects are added to determine an optimum condition for the machine-learning network system 300.

In some implementations, the input data 302 are labeled to specific signal classes, such as Global System for Mobile communication (GSM), Long-Term Evolution (LTE), Industrial Scientific, and Medical (ISM), Frequency Modulation (FM), Worldwide Interoperability for Microwave Access (WiMAX), Digital Video Broadcasting-Terrestrial (DVB-T), Project 25 (P25), Peer to Peer (P2P), Terrestrial Trunked Radio (TETRA), among others, based on their center frequencies, frequency ranges, phases, modulation types, energy ranges, etc. In some cases, some of the input data 302 are labeled to specific signal classes, but others of input data 302 may not be labeled. Such cases are referred to as semi-supervised training in contrast to supervising training in which all the samples are labeled for training the machine-learning network. In some cases, entire input data 302 are not labeled, which is referred to as unsupervised training. In the semi-supervised training, the input data 302 may include labeled data more than unlabeled data. In some examples where the input data 302 includes unlabeled signals, the output 310 provides one or more new class labels corresponding to the unlabeled signals.

In some implementations, the input data 302 are segmented into one or more samples. For example, the input data 302 may be segmented randomly so that each sample may correspond to a type of signal that is labeled to a specific signal class among one or more signal classes that are known to the machine-learning network system 300. For example, a first sample 302A of the input data 302 corresponds to a signal labeled to WiMAX, and a second sample 302B of the input data 302 corresponds to a signal labeled to FM. The one or more samples may include tens, hundreds, thousands, or more samples that are segmented randomly. In some cases, the number of the samples is increased using data augmentation techniques, for example, by flipping a sequence of each sample about an axis corresponding to a time instant. In some examples, the process of randomly segmenting the input data 302 is repeated multiple times. At each repetition, the machine-learning network system 300 may be trained afresh without using prior training results, or optimized using prior training results.

In some implementations, the input data 302 are segmented into one or more regions that are defined in a time-frequency space. In one implementation, the defined regions correspond to the samples described above. In some cases, a region of the one or more regions includes one or more types of RF signals. Some of the one or more regions may include no signal, which corresponds to an empty region in the time-frequency space. During training, the machine-learning network system 300 may receive each region of the input data and output a class estimation for the region. In some implementations, results from the class estimation (e.g., time-frequency bounding boxes) for the region are grouped according to the types of RF signals.

As described above, the machine-learning network layers (e.g., the convolutional layers 304 and dense layers 306) are configured to extract features or information included the sample (e.g., 302A, 302B, 302C, etc.) through linear operations, nonlinear operations, filtering operations, or reducing a dimension of inputs from a prior layer(s). In some examples, the machine-learning network system 300 includes one or more SoftMax layers 308 that normalize an output from the dense layer 306 or reduce the dimension of the output from the dense layer 306. In some implementations, for example, in semi-supervised training, the SoftMax layer 308 is excluded to keep only high level learned feature maps as sparse representations of the input data 302.

In some implementations, the machine-learning network system 300 includes a global average pooling (GAP) layer connected to one of the convolutional layers 304 to generate a class activation map (CAM) as the output 310. In some examples, one or more ReLU operations follow the GAP layer to generate the output 310. The output 310 may visualize one or more areas of the sample in terms of time or frequency that were relevant to prediction of a class corresponding to the sample. For example, if the input 302 includes a specific time and frequency range having a high power or phase, the output 310 may include a noticeable area in the time-frequency space corresponding to the specific time and frequency range.

In some implementations, the output 310 includes one or more bounding boxes 310A, 310B, and 310C that indicate detections of signals in the time-frequency space and that specify time and frequency ranges of the detected signals. In some examples, the bounding boxes 310A, 310B, and 310C are visualized with grids overlaid on a visualization of the input data 302.

In some implementations, the output 310 includes a feature map, which is an output from a layer (e.g., the last dense layer 306) of the machine-learning network by applying a filtering operation to a prior layer. For example, the output 310 may be a feature map corresponding to intermediate information obtained at the convolution layers 304 of the machine-learning network system 300 during training of the machine-learning network system 300. In some cases, the feature maps are an output from each layer of the machine-learning network. By applying the filtering operation, the feature maps may extract features (e.g., peaks, modulations, noises, power levels, emission frequencies, emission times, phases, distortions, etc.) of the input data 302. The feature maps may be also obtained during detection/classification of RF signals once the machine-learning network system 300 is trained with sample RF signals.

In some implementations, the machine-learning network system 300 provides the output 311 corresponding to a classification of the sample such as 302A, 302B, or 302C matching a known signal class. In some cases, the system 300 assigned an arbitrary class number if it determines the sample does not match the known signal classes. In some implementations, the output 310 and the 311 are combined to one output that includes classification of the sample and temporal/spectral localizations together. For example, the bounding box 310A indicates a range of time and frequency as well as includes a classification of the detected signal enclosed by the bounding box 310A.

The network update operation 312 may communicate with one or more of the layers 304, 306, and 308 of the machine-learning network system 300, input data 302, or output data 310. For example, the network update operation 312 includes communications 314, 316, and 318 with the convolutional layers 304, dense layers 306, and the SoftMax layer 308, respectively. The network update operation 312 further includes communications 320, 322, and 324 with the input data 302, the output 310, and the output 311, respectively.

For example, during training, the network update operation 312 determines a loss value as a function of the output 310 and the input data 302 with the samples 302A, 302B, 302B, etc., and adjusts weights or parameters of one or more of the layers 304, 306, or 308. In some cases, the network update operation 312 updates, to minimize the loss value, an architecture of the layers 304, 306, or 308 such as a sequence of the layers, a number (depth) of the layers, and a type of the machine-learning network system 300.

Figure 4:
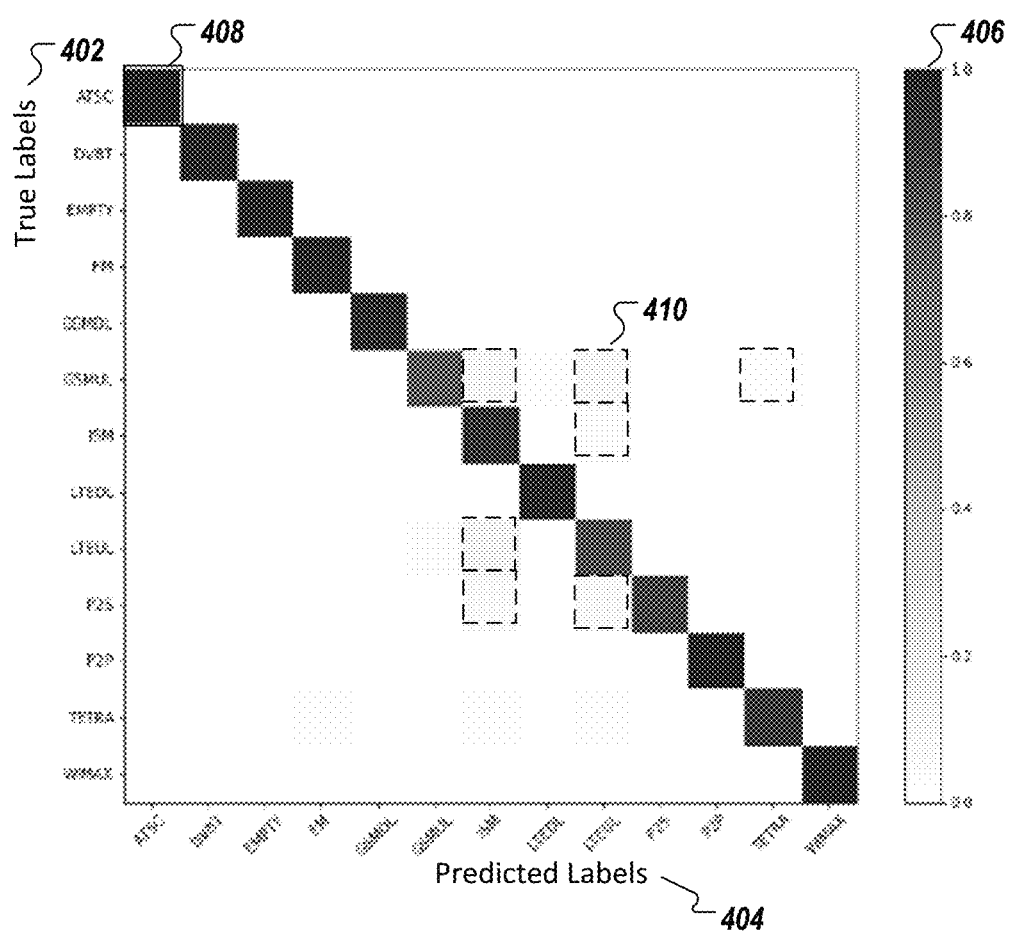
FIG. 4 illustrates an example of prediction results of signal classification using a machine-learning network system.

FIG. 4 illustrates an example of prediction results of signal classification using the machine-learning network system shown in FIG. 3. The machine-learning network system 300 may output probabilities or predicted label classifications of each type of input RF signal, and may compare these labels or probabilities to true labels (i.e. ground truth) in order to obtain a measure of accuracy of the system. In the example shown in FIG. 4, true labels 402 of input RF signals and predicted labels 404 are plotted in a confusion matrix form. The gray scale 406 represents a reference for an accuracy level corresponding to each pair of true label 402 and predicted label 404. For instance, the ATSC-ATSC pair 408 indicates a correct classification of digital television signals, while the GSM UpLink-LTE DownLink (GSMUL-LTEUL) pair 410 indicates an incorrect classification of the GSM uplink signal as LTE uplink signal. In examples where the machine-learning network system 300 is capable of predicting classes of the input RF signals with a high accuracy level, the gray scales of matching pair like the pair 408 appear darker than the gray scales of incorrect pairs like the pair 410. Using these accuracy levels standard receiver operating characteristic (ROC) curve style analysis may be conducted for the system, including constant false alarm rate or other threshold based methods for controlling the sensitivity and operating characteristics of the machine learning system's output decisions and their certainty.

In one implementation, the accuracy level of correct classification may be greater than or equal to 0.91 for various RF input signals. In the same or other implementations, the accuracy levels of correct classification of the GSMUL, LTEUL, and P25 signals may be less than or equal to 0.778, 0.828, and 0.87, respectively. In some implementations, the machine-learning network system 300 is further trained to classify signals that have similar features. For instance, ISM/Wi-Fi, GSMUL, and LTEUL samples include similar emission signals, and they may have low initial accuracy values than other types of RF signals in the beginning of training of the machine-learning network system 300. The network update operation 312 may be performed to update increase the low initial accuracy values for the signals similar to each other.

In some examples, the machine-learning network system 300 takes approximately 0.3 ms to 1.5 ms to classify one sample. This classification time may vary depending on whether the samples are processed in a batch or individually one at a time or the size, configuration or implementation details of the network used. The classification time and misclassification rate of the machine-learning network system 300 may be reduced, for example, by the network update operation 312 where a number of layers, connections between the layers, parameters associated with the layers, a number of training samples, or a size of each training sample are optimized.

Figure 5A:
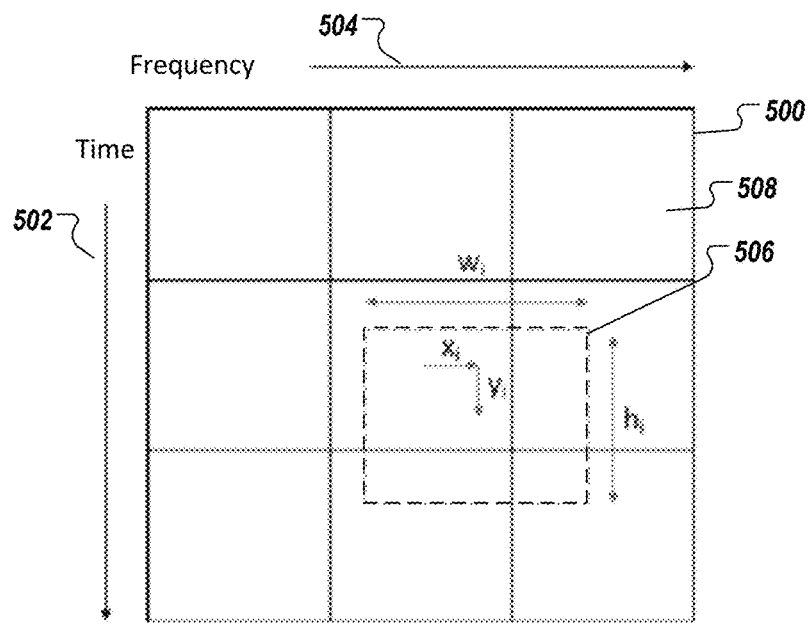
FIGS. 5A and 5B illustrate examples of providing bounding boxes corresponding to a temporal localization and a spectral localization of an RF sample signal.
Figure 5B:
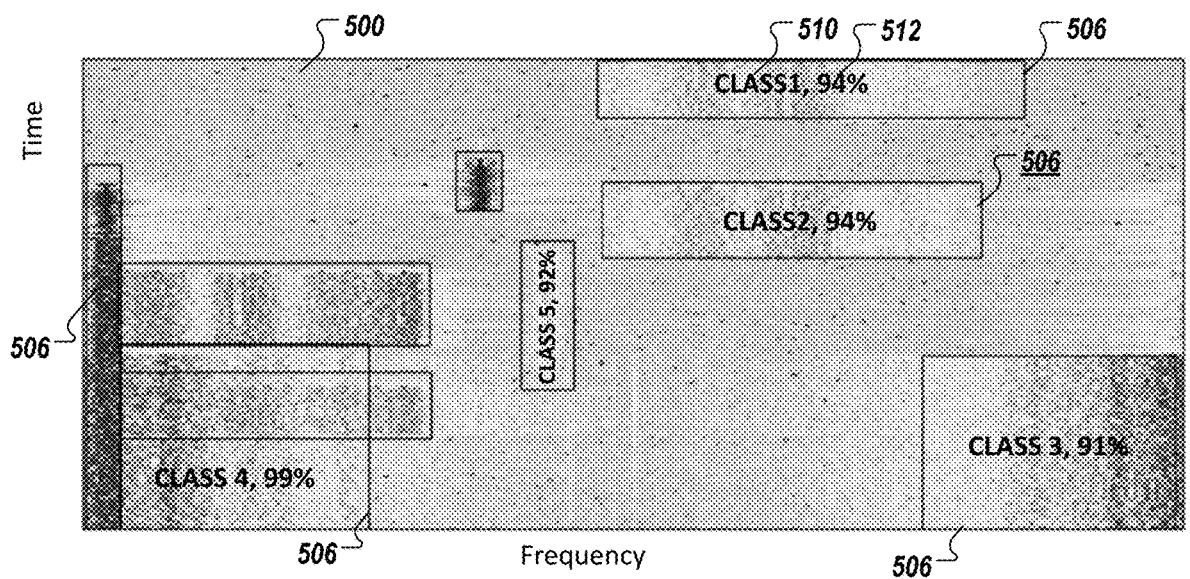

FIGS. 5A and 5B illustrate examples of providing a temporal localization and a spectral localization that are visualized with bounding boxes in a time-frequency space defined by a time axis and a frequency axis. The bounding boxes 506 may be provided to visualize input data or an output of a machine-learning network in the time-frequency space. For instance, the time-frequency space 500 may correspond to a visualization of one or more of the outputs 310 (e.g., 310A, 310B, or 310C) shown in FIG. 3. In other implementations, it may also correspond to multiple output classifications (e.g. output 311) for multiple different time-frequency locations or regions, which may be represented individually or aggregated to form larger contiguous regions corresponding to emissions. In some implementations, the time-frequency space 500 corresponds to a visualization of one or more of the input data 302 (e.g., 302A, 302B, or 302C).

In some implementations, a machine-leaning network for providing a temporal and spectral localization of RF input signals corresponds to the machine-learning network system 300 shown in FIG. 3 or various other types of neural networks. For instance, the machine-learning networks may include one or more of region proposals with convolutional neural networks (R-CNN), a variant of You Only Look Once (YOLO) networks, or a Single Shot Multiple Detector (SSD) network. In some examples, a number of layers, operations and connectivity included in the machine-learning network are changed or reduced to avoid over-fitting parameters of the machine-learning network with available datasets or in some cases to reduce the execution time. For example, the machine-learning network may include nine layers summarized in Table I below.

TABLE I

TABLE INPUT/OUTPUT SHAPES

| Layer Number | Layer Type | Kernel Size | Number of Feature Maps |
|---|---|---|---|
| 1, 2, 3, 4, 5, 6 | Conv + Maxpool | (3, 3) | 16, 32, 64, 128, 256, 512 |
| 7, 8 | Conv | (3, 3) | 1024, 1024 |
| 9 | Conv | (1, 1) | 30 |

In some implementations, the machine-learning network receives raw spectral amplitude, power, phase or similar values in time and frequency as input data, and generate output grids (e.g., boxes) of detections using a series of operations through the convolutional layers that include filtering operations, which result in reduction of a dimension of the input. The input data may include multiple emissions of a single or various types of RF signal over a period of time. The output grids may include multiple grids corresponding to the multiple emissions or various types of RF signals, respectively. The output grids may also include identification of an emitter type or class label or label probabilities from the network associated with bins or groups of bins associated with detections.

Referring to FIG. 5A, in some implementations, the machine-learning network divides the time-frequency space 500 into a plurality of grid cells 508 having position values ($x_i$, $y_i$) and size values (width ($w_i$) and height ($h_i$)). In some cases, the machine-learning network is trained to minimize a distance metric (e.g., mean-squared error value, cross entropy loss, or similar) between target values and predicted values. The position values ($x_i$, $y_i$) correspond to a frequency instant and a time instant, respectively, in the time-frequency space 500. The size values ($w_i$, $h_i$) correspond to a range of frequency and a span of time, respectively, in the time-frequency space 500. The distance metric may be a loss function that summates differences between the position values and their target values as well as differences between the size values and their target values for the plurality of grid cells 508. The loss function may be minimized using various methods such as a stochastic gradient descent method to update parameters or weight values of the machine-learning network until the loss reaches a threshold value. Upon minimizing the loss function, a position and size of the bounding box 506 may be determined and visualized in the time-frequency space 500. In some instances, the network may also be used to detect, identify, and localize emissions in angle of arrival, distance, spatial location, or other continuous localization degrees of freedom as well.

FIG. 5B illustrates an example of multiple bounding boxes in a visualization of RF signals in the time-frequency space. Each bounding box 506 surrounds an emission area defined by a range of frequency and a span of time that are determined by operations of the machine-learning network. Each bounding box 506 represents one instance of a single type of RF signal (e.g. one burst, transmission, packet or portion of these emitted from a radio transceiver). In some cases, the bounding boxes 506 include a signal class 510 corresponding to the predicted type of RF signal and an accuracy level 512 of prediction of the class. The gray (or color) scale in the visualization of RF signals shown in FIG. 5B may correspond to power levels of emissions of the various type of RF signals or phase values of the emissions.

Figure 5C:
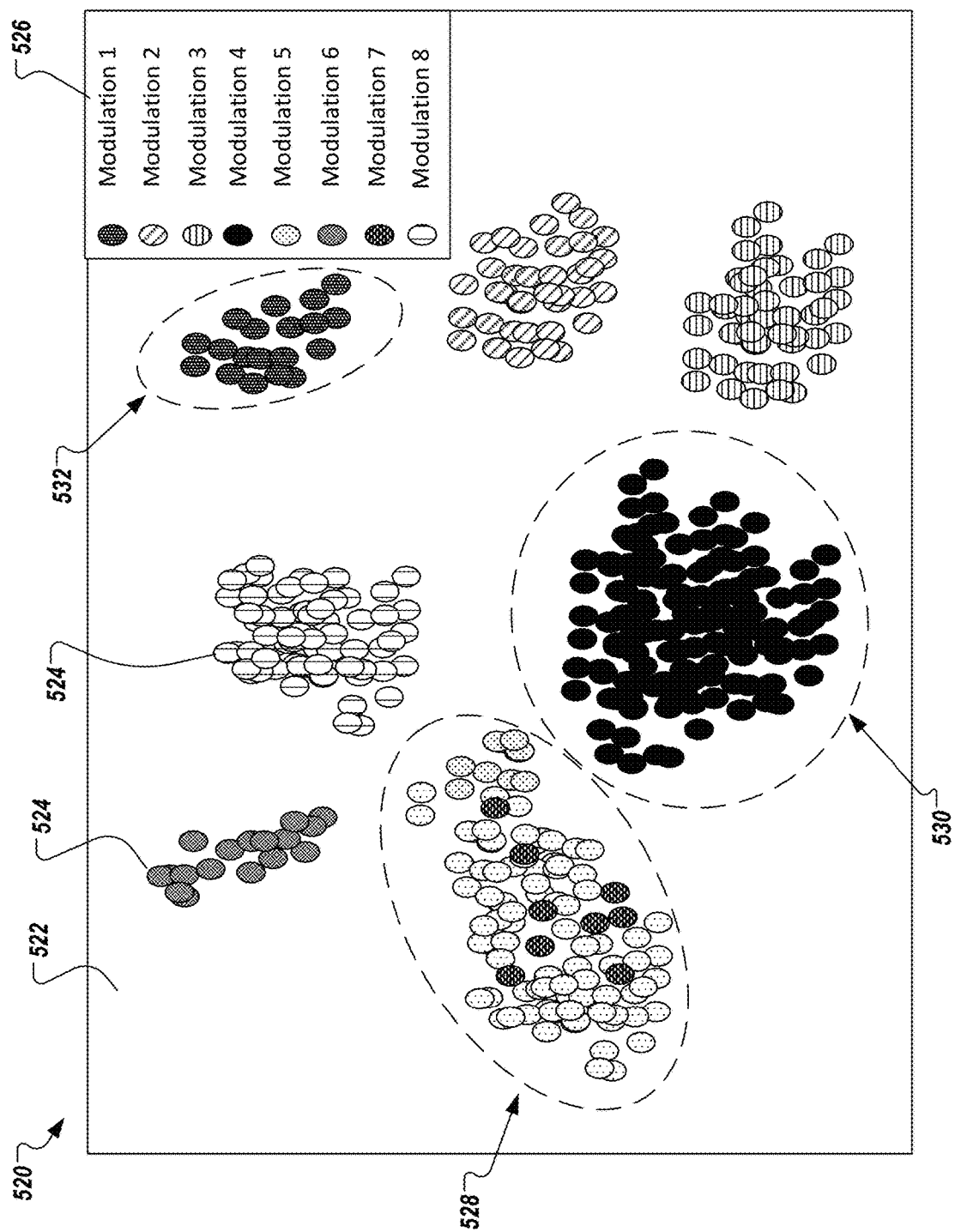
FIG. 5C illustrates an example of a visualization of one or more clusters and labels as an output of a machine-learning network system.

FIG. 5C illustrates an example of a visualization of one or more clusters and labels as an output of a machine-learning network system. For example, the system 300 may provide one or more of the outputs 310, 311, or 520. The output 520 includes one or more representations 524 of example signals visualized in a feature space 522, and labels 526 for the representations 524. The representations 524 may correspond to various features of the example signals such as modulation types, and be visualized in various colors, patterns, or shapes that distinguish the various features of the example signals. The feature space 522 may include a coordinate system to visualize a relative difference between features of the one or more representations 524 as a distance in the feature space. Accordingly, the one or more representations 524 that have the same or similar features are grouped to one or more clusters 528, 530, 532.

A distance between the clusters 528, 530, 532 represents a difference between the features corresponding to the one or more representations 524 in the respective clusters. For example, a modulation type of an example signal in the cluster 530 is more similar to a modulation type of an example signal in the cluster 528 than to a modulation type of an example signal in the cluster 532. In some cases of semi-supervised or unsupervised training, the output 520 may include one or more clusters (e.g., cluster 528) that include two or more different types of representations mixed in a group based on a similarity between the features corresponding to the respective representations 524. In one implementation, the machine-leaning network system 300 determines parameters of one or more layers 304, 306 that reduce such mixture of different types of representations in a cluster.

The output 520 may indicate presence of new types of signals or anomalies in a signal, for example, in curating or monitoring semi-supervised signal identification systems. For instance, the output 520 may visualize new classes of signals at a region outside of the known distribution of clusters in the feature space 522. In some implementations, the output 520 includes one or more clusters that indicate various features such as wireless behaviors, packet types, or sequences of traffic transmitted in a wireless system. In one implementations, the output 520 enables detection of wireless cyber intrusion, new types of hardware failure, or interference signals by visualizing outlier signals in the feature space 522.

FIGS. 6A to 6D illustrate various types of machine-learning networks or portions of machine-learning networks that implement one or more of detection, classification, and temporal and/or spectral localization of input data corresponding to an RF spectrum. Each of the machine-learning networks 600, 620, 640, and 660 includes one or more of convolutional layers, dense layers, SoftMax layers, max pooling layers, and long short term memory (LSTM) layers.

In some implementations, the machine-learning network is a dense neural network (DNN) that includes a high number of free parameters and may leverage heavy dropout (e.g. random selection of neurons to enable during training), which allows an unconstrained mapping between input and output samples. In some implementations, the machine-learning network is a dilated convolutional neural network (DCNN) that includes one or more dilated convolutional layers that apply a filtering operation with a stride number greater than 1. When the stride number is one, the dilated convolutional layer corresponds to a convolutional layer. The one or more dilated convolutional layers may be associated with a rectified linear unit activation function, a linear activation function, hyperbolic tangent (Tanh) activation function, a sigmoid activation function, or a combination thereof.

Figure 6A:
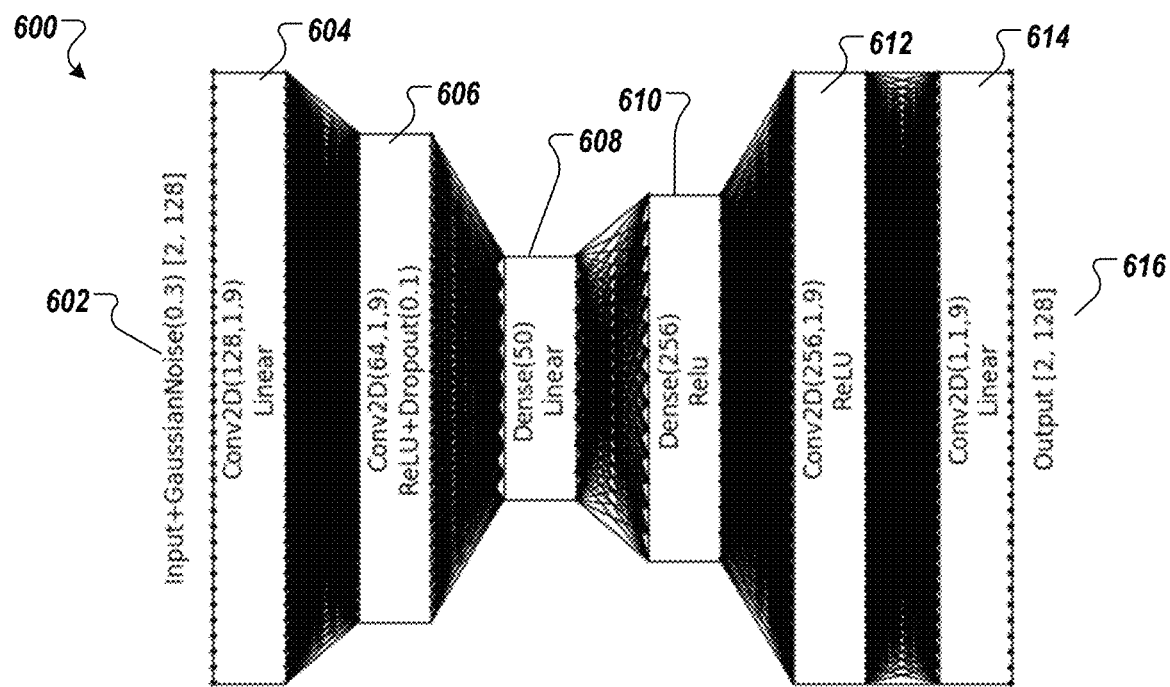
FIGS. 6A to 6D illustrate examples of machine learning networks that implement detection, classification, and localization of input data.

FIG. 6A illustrates an example of an autoencoder network 600 including two dimensional convolutional layers 604, 606 for reducing a dimension of input data 602, one dimensional dense layers 608, 610 for receiving the reduced data from the convolutional layers 604, 606, and two dimensional convolutional layers 612, 614 for reconstructing an output 616. This autoencoder network 600 may be used to generate a sparse or compressed representation of an unlabeled sample signal or may be used to de-noise or reconstruct a stochastically modified version of the signal. For instance, the autoencoder network 600 may be used for unsupervised training in which the optimization goal is to minimize reconstruction error at the output 616 to match the input data 602, through an intermediate representation having a reduced dimension than the input data 602. In some examples, a mean squared error (MSE) loss function is used for optimizing the machine-learning network 600, and a form of stochastic gradient descent may be used as a solver by back-propagating gradients from the loss function to find best network parameters. In other implementations certain other loss functions may be used, for instance with discrete signal sets cross-entropy or f-divergence classes of loss functions may be used.

In some implementations, a sparse representation of a sample signal, which may be labeled or unlabeled, is determined using other dimensionality reduction techniques that are independent of the autoencoder network 600. For instance, Principal Component Analysis (PCA), Independent Component Analysis (ICA), t-Distributed Stochastic Neighbor Embedding (t-SNE), Uniform Manifold Approximation and Projection (UMAP), or similar may be used to determine a sparse representation of input data 602.

Figure 6B:
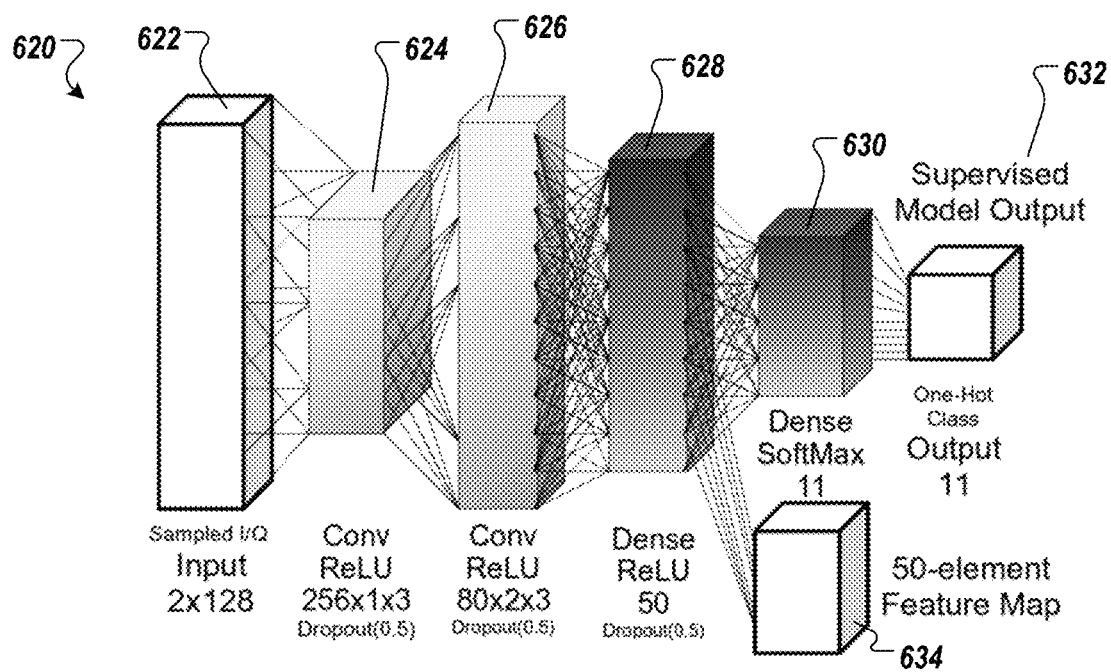

FIG. 6B illustrates an example of a machine-learning network 620 that includes one or more convolutional layers 624, 626, one or more dense layers 628, and a SoftMax layer 630. The machine-learning network 620 may be used in semi-supervised training. For example, the machine-learning network 620 may be first trained using input data labeled with known signal classes to generate a feature map 634 for the labeled input data in supervised training. The feature map 634 may represent features of the input data 622 in a reduced dimension, and be obtained at the dense layer 628 before the SoftMax layer 630. The machine-learning network 620 may generalize the features learned in the supervised training and distill available labels from the input data to provide a capacity to separate additional classes for unlabeled input samples.

Figure 6C:
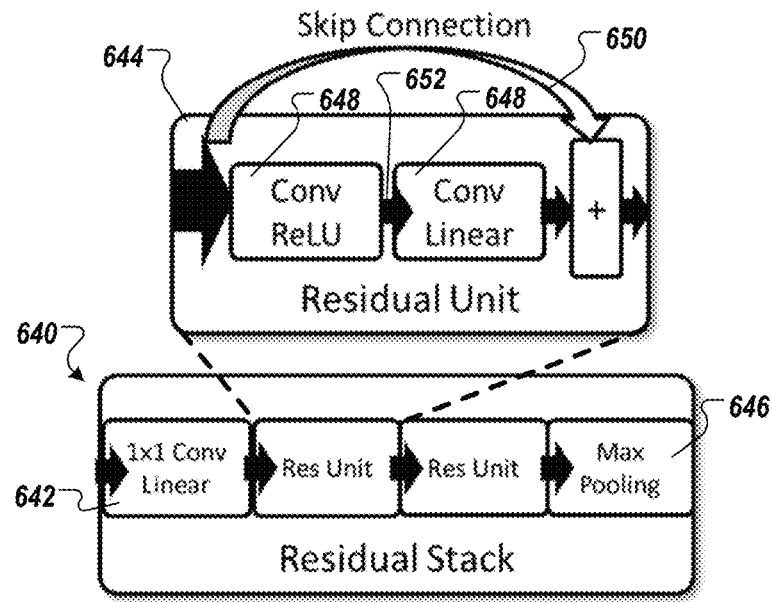

FIG. 6C illustrates an example of a residual layer stack 640 in a residual neural network (ResNet). Table II below shows an example of a ResNet that includes six residual layer stacks 640. In some examples, a ResNet includes one or more residual layer stack 640, each of which may include a convolutional layer 642, one or more residual unit 644, and a max pooling layer 646. The residual unit 644 may include two or more convolutional layers 648 and employ a parallel connection 650 that bypasses the connection 652 between the convolutional layers 648. The parallel connection 650 enables features determined at a layer of the ResNet to be processed at multiple scales and depths through the ResNet. The ResNet may include other layers and activation functions such as a fully connected layer (FC), SoftMax layer, a scaled exponential linear unit (SELU) activation function.

TABLE II

RESNET Network Layout

| Layer | Output dimensions |
|---|---|
| Input | 2 × 1024 |
| Residual Stack | 32 × 512 |
| Residual Stack | 32 × 256 |
| Residual Stack | 32 × 128 |
| Residual Stack | 32 × 64 |
| Residual Stack | 32 × 32 |
| Residual Stack | 32 × 16 |
| FC/SeLU | 128 |
| FC/SeLU | 128 |
| FC/Softmax | 24 |

Figure 6D:
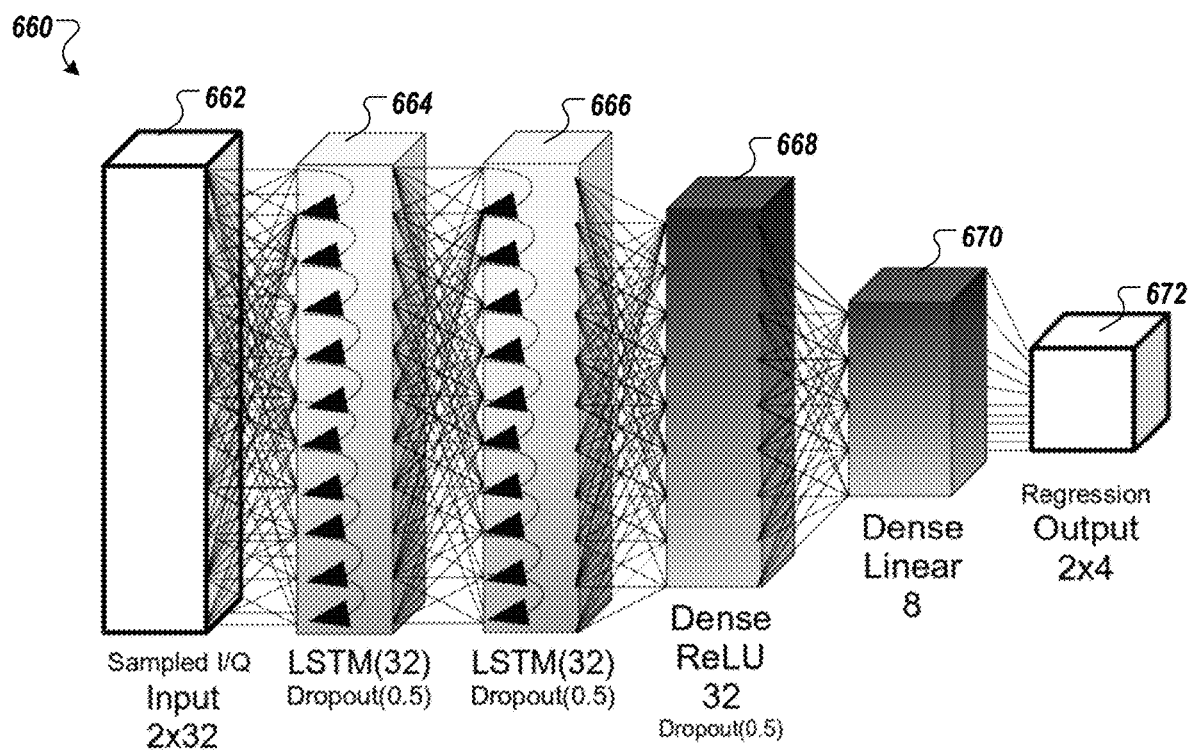

FIG. 6D illustrates an example of a recurrent neural network (RNN) 660 that implements a novelty detection method. The RNN 660 may include one or more LSTM layers 664, 666 that receive input from a prior layer as well as from the LSTM layer 664, 666 themselves. For example, the LSTM layer 664, to generate an output to the next LSTM layer 666 at the time T, may receive an input from the input layer 662 at a time T and learned features at the LSTM layer 664 at a past time T−1. The RNN 660 may include two LSTM layers 664 and 666 followed by two FC layers 668 and 670 with a linear activation function. In some implementations, the RNN 660 is trained to detect anomalies from time series data sets such as RF signals by a regression of complex continuous values provided at the input layer 662.

Figure 7:
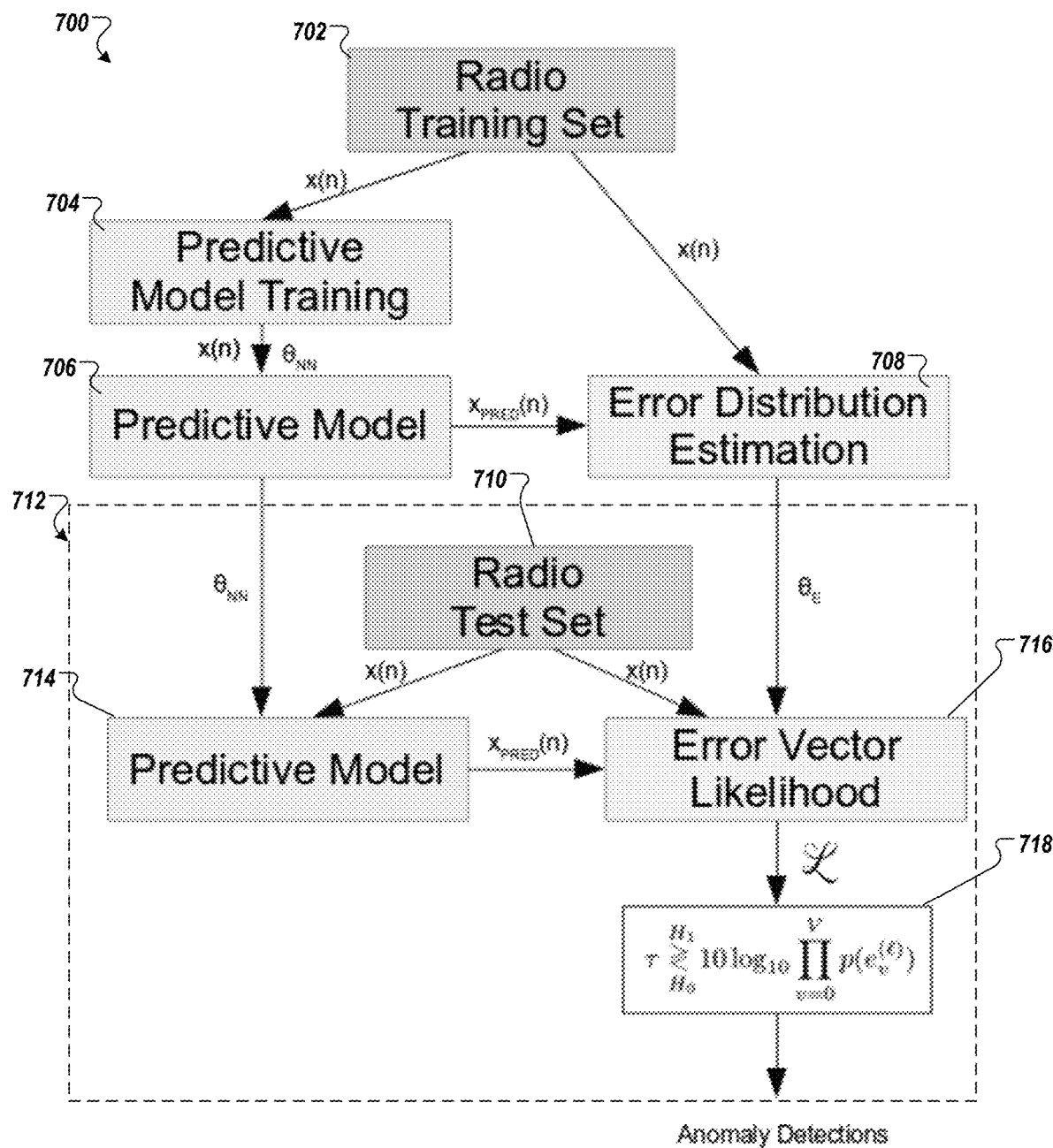
FIG. 7 illustrates an example of an anomaly detection system using a machine-learning network.

FIG. 7 illustrates a flow chart of an anomaly detection system using a machine-learning network. For instance, the anomaly in RF signals may include one or more of pulsed complex sinusoid signals, short-time broadband bursts, brief periods of signal non-linear compression, pulsed quadrature phase shift keying (QPSK) signals, or pulsed chirp events, radio equipment failures, unexpected changes in the presence or operation of wireless equipment, wireless cyber-attacks, jammers or electronic warfare device emissions, or other unexpected emissions occurring within a radio band of operation. In some implementations, the anomaly detection system 700 includes a machine-learning network such as the RNN 660 described in FIG. 6D as a predictor model. In some implementations, the anomaly detection system 700 includes a predictive model training 704 performed by a training dataset 702 to train a predictive model 706 and a test 712 to evaluate the trained predictive model 714 with a test dataset 710. In one implementation, the test dataset 710 is the same as the training dataset 702. In other implementations, the test dataset 710 is different from the training dataset 702.

During the predictive model training 704, the predictive model 706 including a machine-learning network processes input data X(n) corresponding to a portion of the training dataset 702, and optimizes parameters $\theta_{NN}$ of the machine-learning network using the input data X(n) and an output $X_{PRED}(n)$ from the machine-learning network. A predictor error distribution 708 is obtained on the training dataset 702 by computing the difference $E(n)=X(n)-X_{PRED}(n)$ for each predicted value $X_{PRED}(n)$ given the known actual values of X(n). The predictor error distribution 708 is fitted to a parametric or non-parametric density estimation model such as a Gaussian distribution and generated error distribution parameters $\theta_E$.

At the testing 712, the trained predictive model 714 receives the test dataset 710 that includes one or more observation regions, and generates an error vector 716 for each observation region. For example, the error vector 716 corresponds to a difference between an input data X(n) corresponding to an observation region of the test dataset 710 and a predicted output $X_{PRED}(n)$ obtained by processing through the machine-learning network of the predictive model 714. The testing 712 further includes a determination 718 that determines whether the error vector 716 deviates from the predictor error distribution 708. In some implementations, the determination 718 determines anomalies in the observation region by applying a threshold to a log-likelihood value corresponding to a probability that the error vector 716 is within the predictor error distribution 708.

Figure 8A:
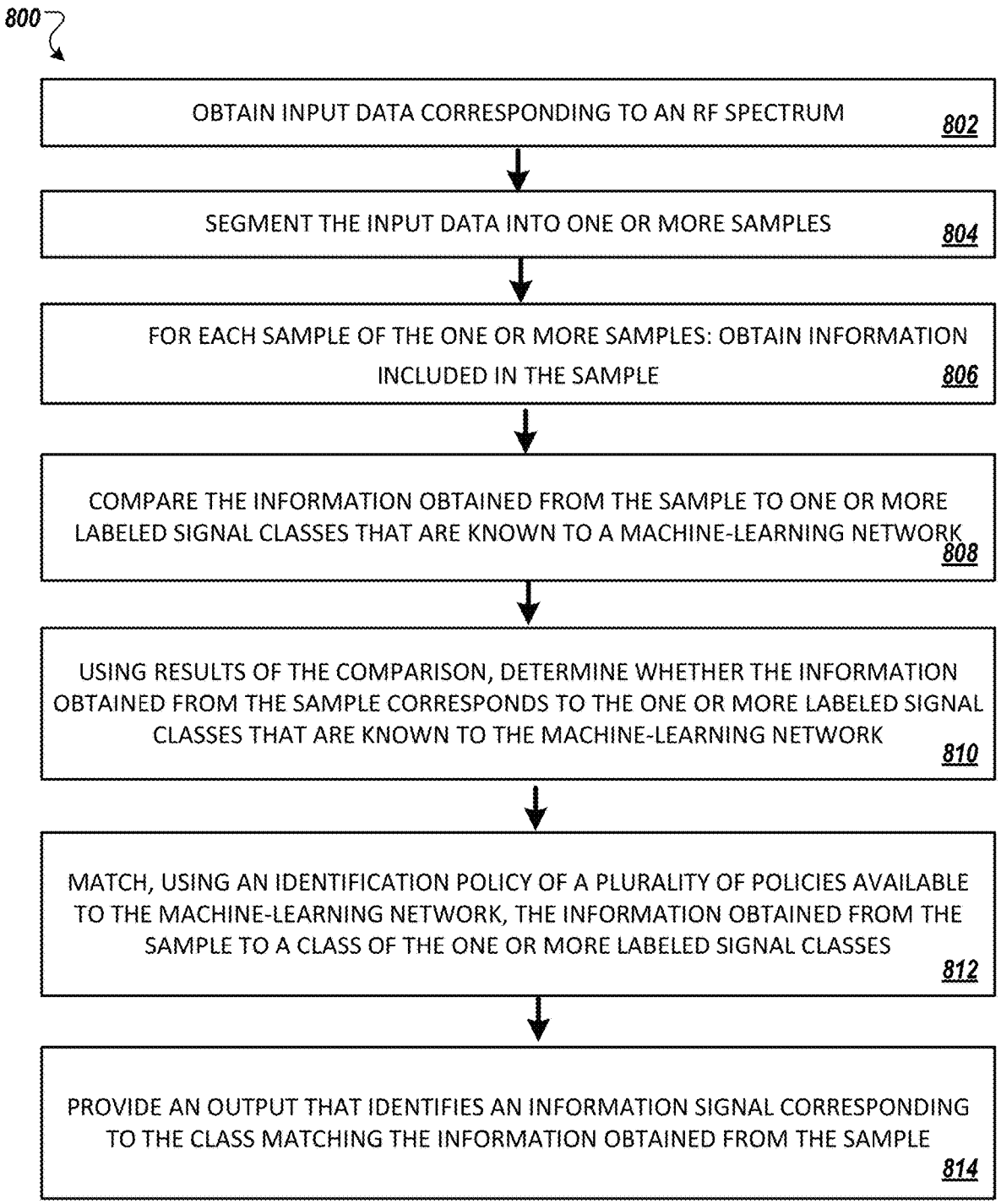

FIG. 8A is a flowchart illustrating an example method of classifying input data corresponding to an RF spectrum using a machine-learning network. In some implementations, the method 800 is performed by a radio communications system, e.g., one of the radio communications system 100, or one of the machine-learning system 200, 300. In some implementations, the method 800 is performed by an apparatus, such as the electronic device (e.g., a cellular phone, a computer, etc.), or an embedded software radio, that implements the machine-learning network architecture 200. Such classification may utilize techniques that were previously learned by a machine-network in supervised training or semi-supervised training techniques discussed referring to FIGS. 3 and 6B above, or similar training techniques.

The method 800 includes, inputting, at 802, data corresponding to an RF spectrum. For example, the input data are one or more of a raw time series of an RF signal, learned filter matrix of the time series, or a transformation of the RF signal. In some examples, the system 100 includes a receiver stage that receives the input data, and an encoder 102 or a decoder that transforms the input data to a format that the machine-learning network can process. In some examples, the system 100 includes an electronic device (e.g., a computer) that synthesize input data. In some examples, the input data may be received from another machine-learning network.

At 804, the input data are segmented into one or more samples. In some examples, the input data are segmented for each sample to include a signal labeled with a known signal class, for example, during supervised training. In some examples, a portion of the samples are labeled with the known signal class, for example, during semi-supervised training. In some implementations, the input data are segmented by a grid pattern defined in a time-frequency space. In those implementations, each grid cell of the grid pattern corresponds to a sample of the one or more samples.

At 806, for each sample of the one or more samples, information is obtained included in the sample. For example, the information includes features of the sample such as peaks, modulations, noises, power levels, emission frequencies, emission times, phases, or distortions. One or more features may be obtained by processing the input data through one or more layers of the machine-learning network. For example, at a convolutional layer of the machine-learning network, a filter matrix is applied to the sample and generate a feature map that represents extracted information or a feature included in the sample. In some implementations, the information included in the sample is at least one of a modulation of a signal portion in the sample, a power range of a signal portion in the sample in a time domain, spectral information of a signal portion in the sample in a frequency domain, spatial information about transmitters and receivers of the input data, or a channel response of the transmitters and receivers.

At 808, the information obtained from the sample is compared to one or more labeled signal classes that are known to a machine-learning network (e.g. by using a distance metric between compressed or feature space representations of two or more examples). For instance, the machine-learning network includes learned features of the one or more labeled signal classes from previous trainings with labeled training samples. The machine-learning network compares information obtained from the sample to the features that were previously learned. In some examples, the sample corresponds to more than one signal class at 808.

At 810, using results of the comparison at 808, the information obtained from the sample is determined whether it corresponds to the one or more labeled signal classes that are known to the machine-learning network. For example, the information obtained from the sample is determined to correspond to the features of one or more signal classes that were previously known. In some cases, the sample includes information such as a preamble, data bit or sequence, or RF samples corresponding to a signal class, and the information is compared to the one or more labeled signal classes to determine whether the signal class included in the sample corresponds to the one or more signal classes that are known to the machine-learning network, or if the sample may belong to a new class which may be unknown or differ from known labels in some way.

At 812, in response to a determination that the information obtained from the sample corresponds to the one or more labeled signal classes that are known to the machine-learning network, the information obtained from the sample is matched, using an identification policy of a plurality of policies available to the machine-learning network, to a class of the one or more labeled signal classes. For instance, the identification policy includes a determination using a distance metric or loss function that calculates differences (e.g., mean squared error) between the information obtained from the sample and the features of the one or more of the signal classes. In some examples, the information obtained from the sample is matched to a class that minimizes a loss term calculated by the loss function. In examples where multiple features of the one or more signal classes are compared to the information, the loss term of the loss function is combined (e.g. through summation) over multiple loss terms corresponding to the multiple features. In some implementations, a user interface leverages cluster information to provide a method for human curation, labeling or inspection of types of emissions. In such cases, the system may allow the user to assign new labels broadly, for instance to make supervision of the machine learning system possible with minimal effort, and to adapt to new emitters, phenomena and situations.

At 814, an output that identifies an information signal corresponding to the class matching the information obtained from the sample is provided. For example, the information signal is a reconstructed signal by processing through the machine-learning network. In some cases, the information signal includes one or more feature maps that represent extracted features of the sample at a layer of the machine-learning network. In some implementations, the machine-learning network system 300 provides an output that visualizes the sample and/or the information signal corresponding to the class in a time-frequency space. In some implementations, the output is the information signal itself without visualization. In some instances, a visualization displays the group or distance between examples to assist in inspecting, curating, or tuning large numbers of examples or large volumes of data.

FIG. 8B is a flow chart illustrating an example method 820 of providing at least one of a temporal localization or a spectral localization of the sample using a machine-learning network. In some implementations, the method 820 is performed by a radio communications system, e.g., the radio communications system 100, one of the machine-learning network system 200, 300. In some implementations, the method 820 is performed by an apparatus, such as the electronic device (e.g., a cellular phone, a computer, etc.), or an embedded software radio, that implements the machine-learning network architecture 200. In some implementations, the method 820 provides the temporal or spectral localization in addition to detection and classification of the sample described above regarding FIG. 8A.

At 822, a determination is made, using the information obtained from the sample, of at least one of a temporal localization or a spectral localization of the information obtained from the sample in the input data. For example, the system 300 may determine a temporal localization or a spectral localization of the information obtained from the sample. The temporal localization may include a determination of a range of reception time of an emission included in the sample and a power level of the emission within the range of reception time. The spectral localization may include a determination of a magnitude and phase of an emission included in the sample in a frequency domain. The system 300 may determine other features such as a gain level, a signal to noise level, a receiver configuration, a reception direction, an emitter or receiver location, etc. from the sample in the input data.

At 824, an output including at least one of the temporal localization or the spectral localization of the information signal in the input data is provided. For example, the system 300 may provide an output that is a visualization of bounding boxes corresponding to the temporal localization and the spectral localization. In some implementations, in addition to the temporal and spectral localization, the system 300 provides an output including one or more of detection, classification, or an accuracy level of classification, as illustrated in FIG. 5B.

In some implementations, one or more clusters or modes are determined that group the one or more samples into the one or more labeled signal classes. For example, the system 300 determines the one or more clusters or modes. In one implementation, in response to a determination that the information obtained from the sample does not correspond to the one or more labeled signal classes that are known to the machine-learning network, the system 300 determines a new cluster that is different from the one or more clusters. In some examples, the new cluster is manually or automatically determined to an arbitrary name (e.g., Modulation-123, Radio-equipment-456). In some instances, these clusters may be determined through the use of programmatic routines such as Density-Based Spatial Clustering of Applications with Noise (DBSCAN), expectation maximization (EM), k-MEANS, or other grouping methods to group examples into a discrete number of clusters or groups of signals. In some instances, the system 300 updates their compressed representation while grouping the examples and leveraging distance information corresponding to the examples.

In some implementations, a distance metric is determined that represents a difference between the sample and a cluster of the one or more clusters. For example, the system 300 determines a distance metric. In such implementations, conditioned on the distance metric being less than or equal to a threshold value, the system 300 determines that the information obtained from the sample corresponds to the one or more labeled signal classes. Further, conditioned on the distance metric being greater than the threshold value, the system 300 may determine that the information obtained from the sample does not correspond to the one or more labeled signal classes.

In some implementations, the machine-learning network or the identification policy is updated to include the information obtained from the sample and the label corresponding to each cluster. For example, the system 300, using the network update operation 312, updates the machine-learning network or the identification policy. In some implementations, in response to a determination that the information obtained from the sample does not correspond to the one or more labeled signal classes that are known to the machine-learning network: the system 300 processes the sample through one or more layers of a second machine-learning network; upon processing the sample through the one or more layers of the second machine-learning network, obtains a compressed representation of the sample from a layer of the one or more layers of the second machine-learning network, where the compressed representation of the sample has a dimension that is a reduction of a dimension of the sample; and determines, using the compressed representation of the sample, a distance metric that represent a difference between the sample and a second sample of the one or more samples. In some examples, the second machine-learning network is different from the machine-learning network. In some examples, the machine-learning network includes the second machine-learning network.

In some implementations, the compressed representation of the sample is obtained from a dimension reduction operation independent of the second machine-learning network. For example, the system 300 obtains the compressed representation of the sample from an electronic device that implements a dimension reduction operation. In some implementations, one or more parameters of the machine-learning network are determined to generate a reconstructed signal corresponding to the sample, and adjusts the one or more parameters of the machine-learning network to minimize a reconstruction error that represents a difference between the sample and the reconstructed signal.

In some implementations, compressed representations of the one or more samples are grouped into one or more clusters or modes based on the distance metrics. In some implementations, based on a deviation of the distance metric from a reference, determining that the sample includes a feature that do not match a feature of the second sample of the one or more samples. In some implementations, learned feature maps are determined corresponding to one or more labeled signal classes that are known to the machine-learning network. In one implementation, in response to a determination that the information obtained from the sample does not correspond to the one or more labeled signal classes or does not match the normal expected behavior or operation of the underlying radio system, determines, using the learned feature maps, one or more clusters corresponding to the sample. An anomaly detection process such as the method 700 may be used to determine the normal expected behavior. In some implementations, the system determines the one or more clusters in response to a determination that the information obtained from the sample do not match expected information corresponding to the RF spectrum.

In some implementations, the sample are modified to include at least one of a noise signal, a frequency offset, a time delay, a fading effect, a distortion effect, or a change in a signal to noise ratio; processes the sample through one or more layers of the machine-learning network, obtaining information included in the modified sample; determines, corresponding to the information obtained from the modified sample, a predicted class among one or more labeled signal classes that are known to the machine-learning network; compares the predicted class with a known class corresponding to the sample; and based on results of the comparison, adjusts at least one of the noise signal, the frequency offset, the time delay, the fading effect, the distortion effect, or the change in the signal to noise ratio. In such scenarios, a level of the adjustment corresponds to an increase in a probability that the predicted class matches the known class corresponding to the sample. In some implementations, the level of the adjustment further corresponds to a decrease in a complexity of determining that the predicted class matches the known class corresponding to the sample. In some examples, the level of the adjustment is determined considering both the classification probability and the computational complexity. For example, the level of the adjustment is determined based on one of a maximum probability of correct classification, a minimum computational complexity, a threshold level of probability or complexity, or any combination thereof. For instance, the level of the adjustment is determined based on the probability being greater than 95% at a minimum computational complexity.

In some implementations, a number of samples and a time length of each sample are determined to increase the probability that the predicted class matches the known class corresponding to the sample. For example, the number of samples is a total number of training examples. In some implementations, the total number of training examples and the length of each example are adjusted to decease the complexity and/or speed in a determination that the predicted class matches the known class corresponding to the sample.

In some implementations, the machine-learning network includes a recurrent neural network that includes one or more recurrent layers or quasi-recurrent layers configured to store data for a known period of time. In such implementations, the system 300 processes the one or more samples through the recurrent neural network to generate an expected error distribution; obtains a second input data corresponding to the RF spectrum, the second input data including one or more observation regions; processes the second input data through the recurrent neural network to generate a predictor error corresponding to each observation region; and determines whether the predictor error corresponding to each observation region deviates from the expected error distribution using a threshold value generated based on a plurality of data streams corresponding to the RF spectrum.

In some implementations, the machine-learning network includes at least one of a deep dense neural network (DNN), a recurrent or quasi-recurrent neural network (RNN) such as one or LSTM layers configured to store data for a certain period of time, a convolutional neural network (CNN) that includes a series of parametric multiplications, additions, and non-linearities, or a residual neural network (ResNet) that employs connections parallel to layers of the machine-learning network or bypasses one or more of the layers of the machine-learning network.

In some implementations, the system 300 obtains at least one of a modulation or signal type of a signal portion in the sample, a power range of a signal portion in the sample in a time domain, spectral information of a signal portion in the sample in a frequency domain, spatial information about transmitters and receivers of the input data, or a channel response of the transmitters and receivers. In some implementations, the system 300 determines whether the class matching the information obtained from the sample corresponds to a correct class of the sample, and determines a probability that represents a likelihood for a next sample to be classified to the correct class among the one or more labeled signal classes that are known to the machine-learning network. The system 300 may provide an accuracy value for each of the one or more labeled signal classes that are known to the machine-learning network.

In some implementations, one or more regions are defined corresponding to temporal and spectral information included in the input data, and provides a predicted class to each of the one or more regions or spectral locations corresponding to the temporal and spectral information. For example, a region of the one or more regions corresponds to a span of time and a range of frequency of a RF signal, and a spectral location corresponds to a point in time and frequency.

Figure 9:
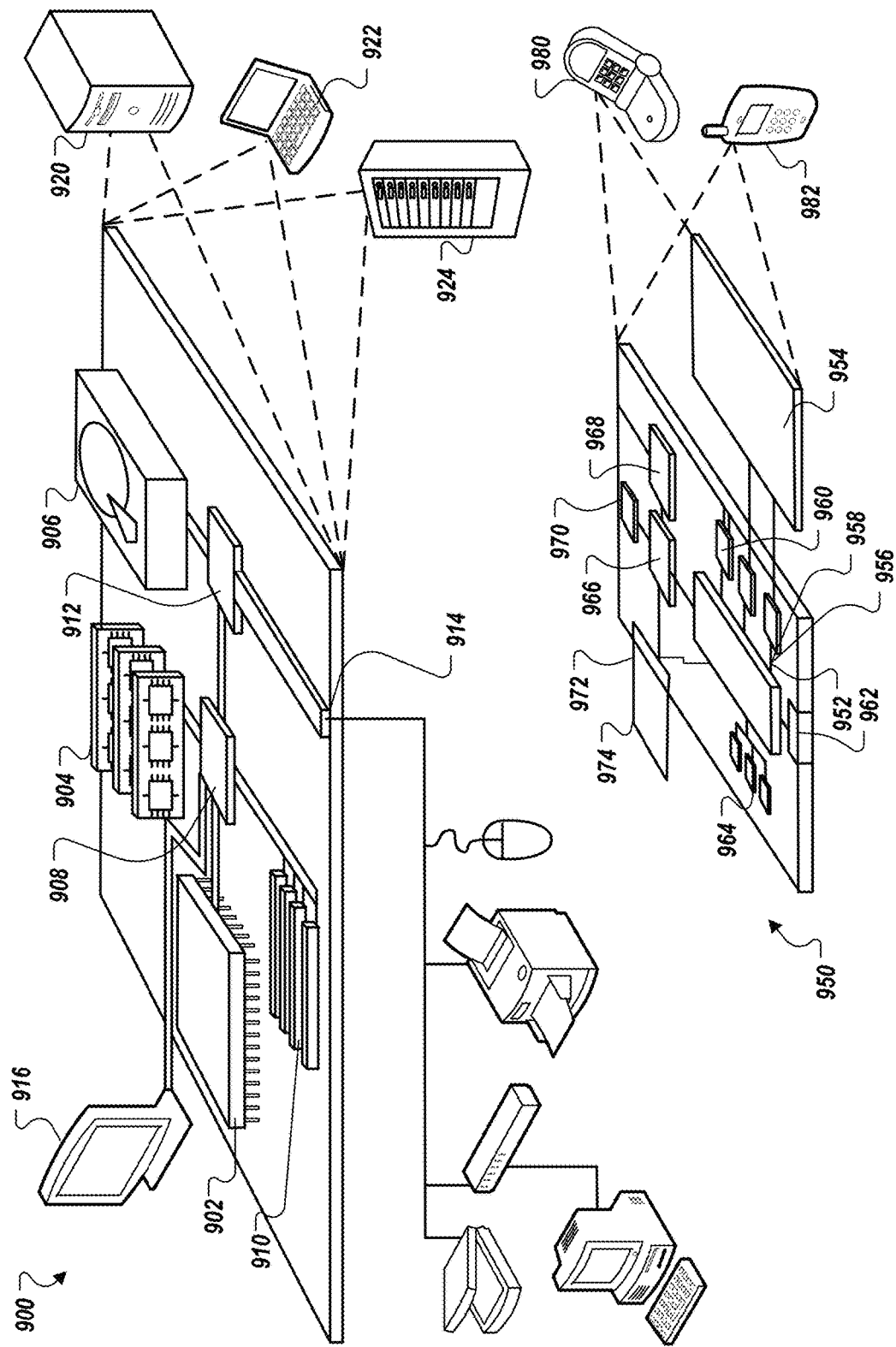
FIG. 9 is a diagram illustrating an example of a computing system that may be used to implement one or more components of a system that performs learned communication over RF channels.

FIG. 9 is a diagram illustrating an example of a computing system that may be used to implement one or more components of a system that performs learned communication over RF channels.

The computing system includes computing device 900 and a mobile computing device 950 that can be used to implement the techniques described herein. For example, one or more parts of an encoder machine-learning network system or a decoder machine-learning network system could be an example of the system 900 described here, such as a computer system implemented in any of the machine-learning networks, devices that access information from the machine-learning networks, or a server that accesses or stores information regarding the encoding and decoding performed by the machine-learning networks.

The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 902 is a single-threaded processor. In some implementations, the processor 902 is a multi-threaded processor. In some implementations, the processor 902 is a quantum computer.

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 is or includes a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902). The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may include one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 is provided, for example, for wired communication in some implementations, or for wireless communication in other implementations. In some examples, multiple interfaces are used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions are received in a propagated signal, for example, over the transceiver 968 or the external interface 962.

The mobile computing device 950 may communicate wirelessly through the communication interface 966, which may include digital signal processing circuitry where needed. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 968 using a radio frequency. In addition, short-range communication may occur, such as using a Bluetooth, Wi-Fi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by one or more processors to detect one or more information signals in a radio frequency (RF) spectrum using a machine-learning network, the method comprising:
   obtaining input data corresponding to the RF spectrum;
   segmenting the input data into one or more samples; and
   for each sample of the one or more samples:
      obtaining information included in the sample,
      comparing the information obtained from the sample to one or more labeled signal classes that are known to the machine-learning network,
      using results of the comparison, determining whether the information obtained from the sample corresponds to the one or more labeled signal classes that are known to the machine-learning network, and
      in response to a determination that the information obtained from the sample corresponds to the one or more labeled signal classes that are known to the machine-learning network:
      matching, using an identification policy of a plurality of policies available to the machine-learning network, the information obtained from the sample to a class of the one or more labeled signal classes, and
      providing an output that identifies an information signal corresponding to the class matching the information obtained from the sample,
   wherein the identification policy is configured to calculate differences between the information obtained from the sample and features of the one or more labeled signal classes, and
   wherein matching the information comprises identifying the class among the one or more labeled signal classes that produces a minimum of the differences calculated using the identification policy, wherein the identifying comprises:
      determining a distance metric that represents a difference (i) between the sample and a cluster of one or more existing clusters, or (ii) between the sample and one or more prior samples that were processed through the machine-learning network, and
      identifying the class based on a comparison of the distance metric to a threshold value.

2. The method of claim 1, further comprising:
   for each sample, determining, using the information obtained from the sample, at least one of a temporal localization or a spectral localization of the information obtained from the sample,
   wherein providing the output comprises providing at least one of the temporal localization or the spectral localization of the information obtained from the sample.

3. The method of claim 2, wherein providing the output for each sample comprises providing at least one of a range of time or a range of frequency that bounds the respective sample in the input data.

4. The method of claim 1, further comprising:
   identifying the one or more existing clusters that group the one or more samples or information included in the one or more samples into the one or more labeled signal classes; and
   in response to a determination that the information obtained from each sample does not correspond to the one or more labeled signal classes that are known to the machine-learning network, determining a new cluster that is different from the one or more existing clusters.

5. The method claim 4, wherein determining whether the information obtained from the sample corresponds to the one or more labeled signal classes that are known to the machine-learning network comprises:
conditioned on the distance metric being less than or equal to the threshold value, determining that the information obtained from the sample corresponds to the one or more labeled signal classes; and
conditioned on the distance metric being greater than the threshold value, determining that the information obtained from the sample does not correspond to the one or more labeled signal classes.

6. The method of claim 4, further comprising:
updating at least one of the machine-learning network or the identification policy to associate the information obtained from the sample to a new label.

7. The method of claim 1, further comprising:
in response to a determination that the information obtained from the sample does not correspond to the one or more labeled signal classes that are known to the machine-learning network:
processing the sample through one or more layers of a second machine-learning network;
upon processing the sample through the one or more layers of the second machine-learning network, obtaining a compressed representation of the sample from a layer of the one or more layers of the second machine-learning network, wherein the compressed representation of the sample has a dimension that is a reduction of a dimension of the sample; and
determining, using the compressed representation of the sample, a distance metric that represents a difference between the sample and a second sample of the one or more samples.

8. The method of claim 7, wherein the second machine-learning network is different from the machine-learning network.

9. The method of claim 7, wherein the machine-learning network includes the second machine-learning network.

10. The method of claim 7, wherein obtaining the compressed representation of the sample comprises obtaining the compressed representation of the sample from a dimension reduction operation independent of the second machine-learning network.

11. The method of claim 7, wherein processing the sample through the one or more layers of the second machine-learning network comprises:
determining one or more parameters of the second machine-learning network to generate a reconstructed signal corresponding to the sample; and
adjusting the one or more parameters of the second machine-learning network to minimize a reconstruction error that represents a difference between the sample and the reconstructed signal.

12. The method of claim 7, further comprising:
grouping, based on the distance metric, compressed representations of the one or more samples into one or more clusters.

13. The method of claim 7, further comprising:
based on a deviation of the distance metric from a reference, determining that the sample includes a feature that does not match a feature of the second sample of the one or more samples.

14. The method of claim 1, further comprising:
determining learned feature maps corresponding to one or more labeled signal classes that are known to the machine-learning network; and
in response to a determination that the information obtained from the sample does not correspond to the one or more labeled signal classes that are known to the machine-learning network, determining, using the learned feature maps, one or more clusters corresponding to the sample.

15. The method of claim 14, wherein determining the one or more clusters further comprises determining the one or more clusters in response to a determination that the information obtained from the sample does not match expected information corresponding to the RF spectrum.

16. The method of claim 1, further comprising:
modifying the sample to include at least one of a noise signal, a frequency offset, a time delay, a fading effect, a distortion effect, or a change in a signal to noise ratio;
processing the sample through one or more layers of the machine-learning network;
obtaining information included in the modified sample;
determining, corresponding to the information obtained from the modified sample, a predicted class among one or more labeled signal classes that are known to the machine-learning network;
comparing the predicted class with a known class corresponding to the sample; and
based on results of the comparison, adjusting at least one of the noise signal, the frequency offset, the time delay, the fading effect, the distortion effect, or the change in the signal to noise ratio,
wherein a level of the adjustment corresponds to an increase in a probability that the predicted class matches the known class corresponding to the sample.

17. The method of claim 16, further comprising:
determining a number corresponding to the one or more samples and a time length of each sample that increase the probability that the predicted class matches the known class corresponding to the sample.

18. The method of claim 16, wherein the level of the adjustment further corresponds to a decrease in a complexity of determining that the predicted class matches the known class corresponding to the sample.

19. The method of claim 1, wherein the machine-learning network comprises a recurrent neural network that includes one or more recurrent layers or quasi-recurrent layers configured to store data for a known period of time, and
wherein the method further comprises:
processing the one or more samples through the recurrent neural network to generate an expected error distribution;
obtaining a second input data corresponding to the RF spectrum, the second input data comprising one or more observation regions;
processing the second input data through the recurrent neural network to generate a predictor error corresponding to each observation region; and
determining whether the predictor error corresponding to each observation region deviates from the expected error distribution using a threshold value generated based on a plurality of data streams corresponding to the RF spectrum.

20. The method of claim 1, wherein the machine-learning network comprises at least one of a deep dense neural network (DNN), a recurrent or quasi-recurrent neural network (RNN) such as one or more long short term memory (LSTM) layers configured to store data for a certain period of time, a convolutional neural network (CNN) that includes a series of parametric multiplications, additions, and non-linearities, or a residual neural network (ResNet) that employs connections parallel to layers of the machine-learning network or bypasses one or more of the layers of the machine-learning network.

21. The method of claim 1, wherein obtaining the information included in the sample comprises obtaining at least one of a modulation of a signal portion in the sample, a signal type of a signal portion in the sample, a power range of a signal portion in the sample in a time domain, spectral information of a signal portion in the sample in a frequency domain, spatial information about transmitters and receivers of the input data, or a channel response of the transmitters and receivers.

22. The method of claim 1, further comprising:
determining whether the class matching the information obtained from the sample corresponds to a correct class of the sample; and
determining a probability that represents a likelihood for a next sample to be classified to the correct class among the one or more labeled signal classes that are known to the machine-learning network,
wherein providing the output further comprises providing an accuracy value for each of the one or more labeled signal classes that are known to the machine-learning network.

23. The method of claim 1, wherein segmenting the input data into the one or more samples comprises defining one or more regions or points corresponding to at least one of temporal or spectral information included in the input data, and
wherein providing the output comprises providing a predicted class to each of the one or more regions or points.

24. At least one non-transitory computer-readable storage medium having stored thereon instructions which, when executed by at least one processor, cause performance of operations comprising:
obtaining input data corresponding to an RF spectrum;
segmenting the input data into one or more samples; and
for each sample of the one or more samples:
obtaining information included in the sample,
comparing the information obtained from the sample to one or more labeled signal classes that are known to a machine-learning network,
using results of the comparison, determining whether the information obtained from the sample corresponds to the one or more labeled signal classes that are known to the machine-learning network, and
in response to a determination that the information obtained from the sample corresponds to the one or more labeled signal classes that are known to the machine-learning network:
matching, using an identification policy of a plurality of policies available to the machine-learning network, the information obtained from the sample to a class of the one or more labeled signal classes, and
providing an output that identifies an information signal corresponding to the class matching the information obtained from the sample,
wherein the identification policy is configured to calculate differences between the information obtained from the sample and features of the one or more labeled signal classes, and
wherein matching the information comprises identifying the class among the one or more labeled signal classes that produces a minimum of the differences calculated using the identification policy, wherein the identifying comprises:
determining a distance metric that represents a difference (i) between the sample and a cluster of one or more existing clusters, or (ii) between the sample and one or more prior samples that were processed through the machine-learning network, and
identifying the class based on a comparison of the distance metric to a threshold value.

25. The at least one non-transitory computer-readable storage medium of claim 24, wherein the operations further comprise:
determining, using the information obtained from the sample, at least one of a temporal localization or a spectral localization of the information obtained from the sample, and
wherein providing the output comprises providing at least one of the temporal localization or the spectral localization of the information obtained from the sample.

26. The at least one non-transitory computer-readable storage medium of claim 25, wherein providing the output for each sample comprises providing at least one of a range of time or a range of frequency that bounds the respective sample in the input data.

27. The at least one non-transitory computer-readable storage medium of claim 24, wherein the operations further comprise:
identifying the one or more existing clusters that group the one or more samples or information included in the one or more samples into the one or more labeled signal classes;
in response to a determination that the information obtained from the sample does not correspond to the one or more labeled signal classes that are known to the machine-learning network, determining a new cluster that is different from the one or more existing clusters; and
updating at least one of the machine-learning network or the identification policy to associate the information obtained from the sample to a new label.

28. The at least one non-transitory computer-readable storage medium of claim 27, wherein determining whether the information obtained from the sample corresponds to the one or more labeled signal classes that are known to the machine-learning network comprises:
conditioned on the distance metric being less than or equal to the threshold value, determining that the information obtained from the sample corresponds to the one or more labeled signal classes; and
conditioned on the distance metric being greater than the threshold value, determining that the information obtained from the sample does not correspond to the one or more labeled signal classes.

29. The at least one non-transitory computer-readable storage medium of claim 24, wherein the operations further comprise:
in response to a determination that the information obtained from the sample does not correspond to the one or more labeled signal classes that are known to the machine-learning network:
processing the sample through one or more layers of a second machine-learning network;
upon processing the sample through the one or more layers of the second machine-learning network, obtaining a compressed representation of the sample from a layer of the one or more layers of the second machine-learning network, wherein the compressed representation of the sample has a dimension that is a reduction of a dimension of the sample; and determining, using the compressed representation of the sample, a distance metric that represents a difference between the sample and a second sample of the one or more samples, wherein obtaining the compressed representation of the sample comprises obtaining the compressed representation of the sample from a dimension reduction operation independent of the second machine-learning network.

30. The at least one non-transitory computer-readable storage medium of claim 29, wherein the second machine-learning network is different from the machine-learning network.

31. The at least one non-transitory computer-readable storage medium of claim 29, wherein the machine-learning network includes the second machine-learning network.

32. The at least one non-transitory computer-readable storage medium of claim 29, wherein processing the sample through the one or more layers of the second machine-learning network comprises:
   determining one or more parameters of the second machine-learning network to generate a reconstructed signal corresponding to the sample; and
   adjusting the one or more parameters of the second machine-learning network to minimize a reconstruction error that represents a difference between the sample and the reconstructed signal.

33. The at least one non-transitory computer-readable storage medium of claim 29, wherein the operations further comprise:
   grouping, based on the distance metric, compressed representations of the one or more samples into one or more clusters.

34. The at least one non-transitory computer-readable storage medium of claim 29, wherein the operations further comprise:
   based on a deviation of the distance metric from a reference, determining that the sample includes a feature that does not match a feature of the second sample of the one or more samples.

35. The at least one non-transitory computer-readable storage medium of claim 24, wherein the operations further comprise:
   determining learned feature maps corresponding to one or more labeled signal classes that are known to the machine-learning network; and
   in response to a determination that the information obtained from the sample does not correspond to the one or more labeled signal classes that are known to the machine-learning network, determining, using the learned feature maps, one or more clusters corresponding to the sample.

36. The at least one non-transitory computer-readable storage medium of claim 35, wherein determining the one or more clusters further comprises determining the one or more clusters in response to a determination that the information obtained from the sample does not match expected information corresponding to the RF spectrum.

37. The at least one non-transitory computer-readable storage medium of claim 24, wherein the operations further comprise:

modifying the sample to include at least one of a noise signal, a frequency offset, a time delay, a fading effect, a distortion effect, or a change in a signal to noise ratio;
processing the sample through one or more layers of the machine-learning network;
obtaining information included in the modified sample;
determining, corresponding to the information obtained from the modified sample, a predicted class among one or more labeled signal classes that are known to the machine-learning network;
comparing the predicted class with a known class corresponding to the sample; and
based on results of the comparison, adjusting at least one of the noise signal, the frequency offset, the time delay, the fading effect, the distortion effect, or the change in the signal to noise ratio,
wherein a level of the adjustment corresponds to an increase in a probability that the predicted class matches the known class corresponding to the sample.

38. The at least one non-transitory computer-readable storage medium of claim 37, wherein the operations further comprise:
   determining a number corresponding to the one or more samples and a time length of each sample that increase the probability that the predicted class matches the known class corresponding to the sample.

39. The at least one non-transitory computer-readable storage medium of claim 37, wherein the level of the adjustment further corresponds to a decrease in a complexity of determining that the predicted class matches the known class corresponding to the sample.

40. The at least one non-transitory computer-readable storage medium of claim 24, wherein the machine-learning network comprises a recurrent neural network that includes one or more recurrent layers or quasi-recurrent layers configured to store data for a known period of time, and
   wherein the operations further comprise:
      processing the one or more samples through the recurrent neural network to generate an expected error distribution;
      obtaining a second input data corresponding to the RF spectrum, the second input data comprising one or more observation regions;
      processing the second input data through the recurrent neural network to generate a predictor error corresponding to each observation region; and
      determining whether the predictor error corresponding to each observation region deviates from the expected error distribution using a threshold value generated based on a plurality of data streams corresponding to the RF spectrum.

41. The at least one non-transitory computer-readable storage medium of claim 24, wherein the machine-learning network comprises at least one of a deep dense neural network (DNN), a recurrent or quasi-recurrent neural network (RNN) such as one or more long short term memory (LSTM) layers configured to store data for a certain period of time, a convolutional neural network (CNN) that includes a series of parametric multiplications, additions, and non-linearities, or a residual neural network (ResNet) that employs connections parallel to layers of the machine-learning network or bypasses one or more of the layers of the machine-learning network.

42. The at least one non-transitory computer-readable storage medium of claim 24, wherein obtaining the information included in the sample comprises obtaining at least one of a modulation of a signal portion in the sample, a signal type of a signal portion in the sample, a power range of a signal portion in the sample in a time domain, spectral information of a signal portion in the sample in a frequency domain, spatial information about transmitters and receivers of the input data, or a channel response of the transmitters and receivers.

43. The at least one non-transitory computer-readable storage medium of claim 24, wherein the operations further comprises:
   determining whether the class matching the information obtained from the sample corresponds to a correct class of the sample; and
   determining a probability that represents a likelihood for a next sample to be classified to the correct class among the one or more labeled signal classes that are known to the machine-learning network, and
   wherein providing the output further comprises providing an accuracy value for each of the one or more labeled signal classes that are known to the machine-learning network.

44. The at least one non-transitory computer-readable storage medium of claim 24, wherein segmenting the input data into the one or more samples comprises defining one or more regions or points corresponding to at least one of temporal or spectral information included in the input data, and
   wherein providing the output comprises providing a predicted class to each of the one or more regions or points.

45. A system comprising:
   at least one processor; and
   at least one computer memory that is operably connectable to the at least one processor and that has stored thereon instructions which, when executed by the at least one processor, cause the at least one processor to perform operations comprising:
      obtaining input data corresponding to an RF spectrum;
      segmenting the input data into one or more samples; and
      for each sample of the one or more samples:
         obtaining information included in the sample,
         comparing the information obtained from the sample to one or more labeled signal classes that are known to a machine-learning network,
         using results of the comparison, determining whether the information obtained from the sample corresponds to the one or more labeled signal classes that are known to the machine-learning network, and
         in response to a determination that the information obtained from the sample corresponds to the one or more labeled signal classes that are known to the machine-learning network:
         matching, using an identification policy of a plurality of policies available to the machine-learning network, the information obtained from the sample to a class of the one or more labeled signal classes, and
         providing an output that identifies an information signal corresponding to the class matching the information obtained from the sample,
      wherein the identification policy is configured to calculate differences between the information obtained from the sample and features of the one or more labeled signal classes, and
      wherein matching the information comprises identifying the class among the one or more labeled signal classes that produces a minimum of the differences calculated using the identification policy, wherein the identifying comprises:
         determining a distance metric that represents a difference (i) between the sample and a cluster of one or more existing clusters, or (ii) between the sample and one or more prior samples that were processed through the machine-learning network, and
         identifying the class based on a comparison of the distance metric to a threshold value.

\* \* \* \* \*

UNITED STATES PATENT AND TRADEMARK OFFICE
CERTIFICATE OF CORRECTION

| | |
|---|---|
| PATENT NO. | : 11,630,996 B1 |
| APPLICATION NO. | : 16/017396 |
| DATED | : April 18, 2023 |
| INVENTOR(S) | : Timothy James O'Shea and Tamoghna Roy |

It is certified that error appears in the above-identified patent and that said Letters Patent is hereby corrected as shown below:

In the Claims

Column 33, Line 3, In Claim 5, after "method" insert -- of --.

Signed and Sealed this
Thirtieth Day of May, 2023

*Katherine Kelly Vidal*

Katherine Kelly Vidal
*Director of the United States Patent and Trademark Office*